(12) United States Patent
Suzuki et al.

(10) Patent No.: US 10,477,241 B2
(45) Date of Patent: Nov. 12, 2019

(54) VIDEO PREDICTION ENCODING DEVICE, VIDEO PREDICTION ENCODING METHOD, VIDEO PREDICTION DECODING DEVICE AND VIDEO PREDICTION DECODING METHOD

(71) Applicant: NTT DOCOMO, INC., Chiyoda-ku, Tokyo (JP)

(72) Inventors: Yoshinori Suzuki, Tokyo (JP); Choong Seng Boon, Tokyo (JP); Thiow Keng Tan, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/152,002

(22) Filed: Oct. 4, 2018

(65) Prior Publication Data
US 2019/0037235 A1    Jan. 31, 2019

Related U.S. Application Data

(63) Continuation of application No. 15/445,533, filed on Feb. 28, 2017, now Pat. No. 10,123,042, which is a
(Continued)

(30) Foreign Application Priority Data

Sep. 24, 2012  (JP) ................ 2012-209626

(51) Int. Cl.
*H04N 19/59*        (2014.01)
*H04N 19/593*       (2014.01)
(Continued)

(52) U.S. Cl.
CPC .......... *H04N 19/59* (2014.11); *H04N 19/117* (2014.11); *H04N 19/136* (2014.11);
(Continued)

(58) Field of Classification Search
None
See application file for complete search history.

(56) References Cited

U.S. PATENT DOCUMENTS 6,765,964 B1   7/2004 Conklin
7,003,035 B2   2/2006 Tourapis et al.
(Continued)

FOREIGN PATENT DOCUMENTS

CN    102227911 A    10/2011
CN    102422643      4/2012
(Continued)

OTHER PUBLICATIONS

Bross, Benjamin et al., "High efficiency video coding (HVEC) text specification draft 8," *Joint Collaborative Team on Video Coding (JCT-VC) of ITU-T SG16 WP3 and ISO/IEC JTC1/SC29/WG11*, 10th Meeting: Stockholm, SE, Jul. 11-20, 2012, Document: JCTVC-J10003_d7, 261 pages.
(Continued)

*Primary Examiner* — Dakshesh D Parikh
(74) *Attorney, Agent, or Firm* — Brinks Gilson & Lione

(57) ABSTRACT

A decoding device includes a decoder that decodes information of a direction of intra-picture prediction of a target block and compression data of a residual signal, a prediction signal generator that generates an intra-picture prediction signal using the information of the direction and an previously reconstructed reference sample of an adjacent block, a residual signal restorator that restores a reconstructed residual signal of the target block, and a block storage that restores and stores a pixel signal of the target block. The prediction signal generator derives reference samples from a previously reconstructed block neighbouring the target block stored, selects two or more key reference samples, performs an interpolation process between the key reference samples for generating interpolated reference samples, and
(Continued)

generates the intra-picture prediction signal by extrapolating the interpolated reference samples based on the direction of the intra-picture prediction.

2 Claims, 17 Drawing Sheets

Related U.S. Application Data continuation of application No. 14/665,545, filed on Mar. 23, 2015, now Pat. No. 9,736,494, which is a continuation of application No. PCT/JP2013/066616, filed on Jun. 17, 2013.

(51) Int. Cl.
| | |
|---|---|
| H04N 19/82 | (2014.01) |
| H04N 19/159 | (2014.01) |
| H04N 19/176 | (2014.01) |
| H04N 19/52 | (2014.01) |
| H04N 19/117 | (2014.01) |
| H04N 19/86 | (2014.01) |
| H04N 19/136 | (2014.01) |
| H04N 19/513 | (2014.01) |
| H04N 19/625 | (2014.01) |
| H04N 19/61 | (2014.01) |
| H04N 19/46 | (2014.01) |

(52) U.S. Cl.
CPC ......... *H04N 19/159* (2014.11); *H04N 19/176* (2014.11); *H04N 19/52* (2014.11); *H04N 19/521* (2014.11); *H04N 19/593* (2014.11); *H04N 19/625* (2014.11); *H04N 19/82* (2014.11); *H04N 19/86* (2014.11); *H04N 19/46* (2014.11); *H04N 19/61* (2014.11)

(56) References Cited

U.S. PATENT DOCUMENTS

| | | | |
|---|---|---|---|
| 8,483,496 | B2 | 7/2013 | Boon et al. |
| 2011/0310976 | A1 | 12/2011 | Wang et al. |
| 2012/0082222 | A1* | 4/2012 | Wang ................... H04N 19/176 375/240.12 |
| 2012/0106862 | A1 | 5/2012 | Sato |
| 2012/0163457 | A1 | 6/2012 | Wahadaniah et al. |
| 2012/0287998 | A1 | 11/2012 | Sato |
| 2013/0294511 | A1* | 11/2013 | Sjoberg ................... H04N 19/50 375/240.12 |
| 2014/0105290 | A1 | 4/2014 | Kwon et al. |

FOREIGN PATENT DOCUMENTS

| | | |
|---|---|---|
| EP | 2 712 192 A2 | 3/2014 |
| WO | WO2012/161444 | 11/2012 |

OTHER PUBLICATIONS

Wahadaniah, Viktor et al., "Constrained Intra Prediction Scheme for Flexible-Sized Prediction Units in HEVC," *Joint Collaborative Team on Video Coding (JCT-VC) of ITU-T SG16 WP3 and ISO/IEC JTC1/SC29/WG11*, 4th Meeting: Daegu, KR, Jan. 20-28, 2011, Document: JCTVC-D094, 8 pages.

International Search Report, and English language translation thereof, in corresponding International Application No. PCT/JP2013/066616, dated Sep. 17, 2013, 4 pages.
International Preliminary Report on Patentability and Written Opinion in corresponding International Application No. PCT/JP2013/066616, dated Apr. 2, 2015, 6 pages.
Examination Report No. 1 in corresponding Australian Patent Application No. 2013319537 dated Oct. 27, 2015, 3 pages.
Taiwan Office Action with English translation, dated Dec. 21, 2015, pp. 1-10, Taiwan Patent Application No. 102124008, Taiwan Intellectual Property Office, Taipei City, Taiwan.
Decision to Grant a Patent with English translation, dated Jul. 28, 2015, pp. 1-7, issued in Japanese Patent Application No. 2012-209626, Japan Patent Office, Tokyo, Japan.
Davies, T., et al., "Suggestion for a Test Model," dated May 7, 2010, pp. 1-30, Document: JCTVC-A033, Joint Collaborative Team on Video Coding (JCT-VC) of ITU-T SG16 WP3 and ISO/IEC JTC1/SC29/WG11, 1st Meeting, Dresden, Germany, Apr. 15-23, 2010. URL: http://WFTP3.ITU.INT/AV-ARCH/JCTVC-SITE/ May 7, 2010, XP030007526.
Tan, T., et al., "Contouring artefact and solution," dated Oct. 1, 2012, pp. 1-8, Document: JCTVC-K0139, Joint Collaborative Team on Video Coding (JCT-VC) of ITU-T SG16 WP3 and ISO/IEC JTC1/SC29/WG11, 11th Meeting, Shanghai, China, Oct. 10-19, 2012. URL: http://WFTP3.ITU.INT/AV-ARCH/JCTVC-SITE/ Oct. 1, 2012, XP030113021.
Extended European Search Report, dated May 12, 2016, pp. 1-11, issued in European Patent Application No. 13839473.9, European Patent Office, Munich, Germany.
Korean Office Action with English translation, dated May 20, 2016, pp. 1-6, issued in Korean Patent Application No. 10-2015-7010543, Korean Intellectual Property Office, Daejeon, Republic of Korea.
Canadian Office Action, dated Aug. 8, 2016, pp. 1-4, issued in Canadian Patent Application No. 2,885,802, Canadian Intellectual Property Office, Gatineau, Quebec, Canada.
Chinese Office Action dated Sep. 23, 2016, pp. 1-10, issued in Chinese Patent Application No. 201380041882.X, State Intellectual Property Office of China, Beijing, China, P.R.C.
European Office Action, dated Oct. 13, 2016, pp. 1-7, issued in European Patent Application No. 13 839 473.9-1908, European Patent Office, Munich, Germany.
Extended European Search Report, dated May 17, 2017, pp. 1-11, issued in European Patent Application No. 17152385.5, European Patent Office, Munich, Germany.
Chinese Office Action, dated Jun. 2, 2017, pp. 1-13, issued in Chinese Patent Application No. 201610681393.6, The State Intellectual Property Office of the People's Republic of China, Beijing, China.
Brazilian Office Action, dated Jan. 30, 2018, pp. 1-13, issued in Brazilian Patent Application No. BR112015006109-5, WIPO Brazil Office, Rio de Janeiro, Brazil.
Brazilian Office Action with English translation, dated Jan. 24, 2018, pp. 1-15, issued in Brazilian Patent Application No. BR122016013354-0, Brazil National Institute of Industrial Property, Rio de Janeiro, RJ, Brazil.
India Office Action, dated Aug. 14, 2018, pp. 1-7, issued in India Patent Application No. 3265/DELNP/2015, India Patent Office, Delhi, India.
U.S. Office Action, dated Mar. 5, 2019, pp. 1-15, issued in U.S. Appl. No. 16/152,025, U.S. Patent and Trademark Office, Alexandria, VA.

* cited by examiner

VIDEO PREDICTION ENCODING DEVICE, VIDEO PREDICTION ENCODING METHOD, VIDEO PREDICTION DECODING DEVICE AND VIDEO PREDICTION DECODING METHOD

RELATED APPLICATIONS

This application is a continuation of U.S. patent application Ser. No. 15/445,533, filed on Feb. 28, 2017, which is a continuation of U.S. patent application Ser. No. 14/665,545, filed on Mar. 23, 2015, which is a continuation of PCT/JP2013/066616, filed on Jun. 17, 2013, which claims priority to Japanese Application No. 2012-209626, filed on Sep. 24, 2012. The entire contents of these applications are incorporated herein by reference.

TECHNICAL FIELD

The present invention relates to a moving picture prediction encoding device and method, and a moving picture prediction decoding device and method, and more particularly to filter processing of neighbouring samples for use in intra-picture prediction.

BACKGROUND ART

Compression encoding technologies are used to efficiently transmit and accumulate moving picture data. MPEG-1 to 4 and H.261 to H.264 are widely used video coding technologies.

In such video coding technologies, encoding processing and decoding processing are carried out after an image to be encoded is divided into a plurality of blocks. In intra-picture prediction encoding, a prediction signal is generated using a previously reconstructed neighbouring image signal (obtained by restoring compressed image data) located within the current picture where a target block is included, and thereafter a differential signal is obtained by subtracting the prediction signal from the signal of the target block and encoded. In inter-picture prediction encoding, referring to a previously reconstructed image signal within a picture different from the picture within which the target block is included, motion compensation is carried out, and a prediction signal is generated. The prediction signal is subtracted from the signal of the target block to generate a differential signal, and the differential signal is encoded.

Ordinarily, in inter-picture prediction (inter prediction) encoding, a prediction signal is generated by searching previously reconstructed pictures for a signal resembling the pixel signal of a block to be encoded previously. A motion vector that represents the spatial displacement amount between the target block and the region formed by the signal searched for, and the residual signal between the pixel signal of the target block and the prediction signal are encoded. The technique of searching respective bocks for the motion vector in this way is called block matching.

FIG. 10 is a schematic diagram for explaining the block matching process. Here, the procedure for generating a prediction signal is described with an example in which a picture 701 includes a target block 702 to be encoded. A reference picture 703 has previously been reconstructed. A region 704 is located at the spatially same position as the target block 702 is located. In the block matching process, a search region 705 neighbouring the region 704 is defined, and from the pixel signals in the search region, a region 706 is to be detected that has the lowest sum of the absolute differences from the pixel signals of the target block 702. The signal of the region 706 becomes a prediction signal, and the displacement amount from the region 704 to the region 706 is detected as a motion vector 707. Furthermore, a method is commonly used in which a plurality of reference pictures 703 is identified for each target block, a reference picture is selected on which the block matching is performed, and reference picture selection information is generated. In H.264, in order to cope with local feature changes in images, a plurality of prediction types are provided which are used with different block sizes each for encoding a motion vector. The prediction types of H.264 are described, for example, in Patent Literature 2.

H264 also performs intra-picture prediction (intra prediction) encoding in which a prediction signal is generated by extrapolating, in predetermined directions, the values of the previously reconstructed pixels adjacent to a block to be encoded. FIG. 11 is a schematic diagram for explaining the intra-picture prediction used in ITU H.264. In FIG. 11(A), a target block 802 is a block to be encoded, and a pixel group (reference sample group) 801 is from an adjacent region which includes image signal previously reconstructed in previous processing, and the group includes pixels A to M adjacent to the boundary of the target block 802 previously reconstructed.

In this case, a prediction signal is generated by extending the pixel group (reference sample group) 801 of adjacent pixels immediately above the target block 802 in the downward direction. In FIG. 11(B), a prediction signal is generated by extending the previously reconstructed pixels (I to L) located on the left of a target block 804 in the rightward direction. A detailed explanation for generating a prediction signal is given, for example, in Patent Literature 1. The difference from the pixel signal of the target block is calculated for each of the nine prediction signals generated as shown in FIGS. 11(A)-11(B). The prediction signal having the smallest difference value is selected as the optimum prediction signal. As described above, prediction signals (intra prediction samples) can be generated by extrapolating the pixels. The description above is provided in Patent Literature 1 below.

The intra-picture prediction shown in Non Patent Literature 1 provides 25 types of prediction signal generation methods all performed in different directions of extending reference samples, in addition to the 9 types described above (a total of 34 types).

In Non Patent Literature 1, in order to suppress distortions in reference samples, the reference samples are subjected to a low pass filter before a prediction signal is generated. Specifically, a 121 filter having weight coefficients of 1:2:1 is applied to the reference samples before the extrapolation prediction. This processing is called intra smoothing.

With reference to FIG. 7 and FIG. 8, the intra-picture prediction in Non Patent Literature 1 is described. FIG. 7 shows an example of block division. Five blocks 220, 230, 240, 250, and 260 adjacent to a target block 210, which has a block size of N×N samples, have previously been reconstructed. For intra prediction of the target block 210, reference samples denoted as ref[x] (x=0 to 4N) are used. FIG. 8 shows the process flow of the intra prediction. First, in step 310, reference samples ref[x] (x=0 to 4N) are derived from a memory into which a prediction signal generator for carrying out the intra-picture prediction process stores reconstructed pixels. In the step, some of the adjacent blocks may not have been reconstructed because of the encoding order, and all the 4N+1 samples ref[x] may not be derived. If it is the case, the missing samples are substituted with samples generated by a padding process (the values of the neighbouring samples are copied), whereby 4N+1 reference samples are prepared. The details of the padding process are described in Non Patent Literature 1. Next, in step 320, the prediction signal generator performs the smoothing process on the reference samples using the 121 filter. Finally, in step 330, the prediction signal generator predicts a signal in the target block by extrapolations (in the directions of intra-picture prediction) and generates a prediction signal (i.e., intra prediction samples).

CITATION LIST

Patent Literature

Patent Literature 1: U.S. Pat. No. 6,765,964
Patent Literature 2: U.S. Pat. No. 7,003,035

Non Patent Literature

Non Patent Literature 1: B. Bross et al., "High efficiency video coding (HEVC) text specification draft 8", Joint Collaborative Team on Video Coding (JCT-VC) of ITU-T SG16 WP3 and ISO/IEC JTC1/SC29/WG11, JCTVC-J1003, 10th Meeting: Stockholm, Sweden, 11-20 Jul. 2012.

SUMMARY OF THE INVENTION

Technical Problem

FIG. 9 shows an example of a signal representing a flat region in which pixel values are similar. When the original pixel values (original sample values) 410 are encoded by coarse quantization, reconstructed values (reconstructed sample values) 420 in the block take a constant value, and a step-like distortion appears at a block boundary 430. This distortion is known as block noise and is usually removed by applying a block noise removing filter to the reconstructed image. However, the reference sample used in intra-picture prediction is a signal prepared previously to the application of the filter process for removing block noise, so that the block noise remaining in the reference sample at the block boundary propagates to the prediction signal (intra prediction samples) of the target block through intra-picture prediction. The block noise that has propagated to the prediction signal cannot be removed by a block noise removal process for a reconstructed signal and therefore propagates directly to the reference sample group for the next target block.

In Non Patent Literature 1, 34 different types of extrapolation directions are prepared in the extrapolation method of intra-picture prediction (in the directions of intra-picture prediction), so that block noise propagates while changing directions. As a result, a plurality of contouring artifacts are produced in the reconstructed signal of a flat region in an image. In particular, when noise propagates to a block of a large size, contouring artifacts run across the large block, giving an unpleasant visual effect.

The 121 filter described in Background Art can effectively remove noise within reference samples but cannot remove step-like noise as illustrated in FIG. 9 because of a short tap number.

The object of the present invention is to suppress artificial noise such as the contouring artifacts described above.

Solution to Problem

A moving picture prediction encoding device according to an aspect of the present invention includes a block divider that divides an input image into a plurality of blocks, a prediction signal generator that generates, using previously reconstructed reference samples located adjacent to a target block to be encoded among the divided blocks from the block divider, an intra-picture prediction signal of a block having a higher correlation with the target block previously reconstructed. The moving picture prediction encoding device further includes a residual signal generator that generates a residual signal between the prediction signal of the target block and the pixel signal of the target block, a residual signal compressor that compresses the residual signal generated by the residual signal generator, a residual signal restorator that generates a reconstructed residual signal by restoring the compressed residual signal, an encoder that encodes the compressed residual signal, and a block storage that restores the pixel signal of the target block by adding the prediction signal to the reconstructed residual signal, and stores the restored pixel signal of the target block to be used as reference samples. The prediction signal generator derives reference samples from previously reconstructed blocks, stored in the block storage, which surround the target block, selects two or more key reference samples from the reference samples, performs an interpolation process between the key reference samples for generating interpolated reference samples, determines a direction of intra-picture prediction, and generates the intra-picture prediction signal by extrapolating the interpolated reference samples based on the determined direction of the intra-picture prediction. The encoder encodes information of the direction of intra-picture direction together with the compression data of the residual signal.

In the moving picture prediction encoding device described above, the prediction signal generator may selectively carry out the interpolation process of the reference samples or a smoothing process of the reference samples, based on a comparison between the key reference samples and a predetermined threshold.

In the moving picture prediction encoding device described above, the reference samples may be such reference samples as located at the end of the reference sample group, and the interpolation process may be a bilinear interpolation process performed on the reference samples between the key reference samples.

A moving picture prediction decoding device according to an aspect of the present invention includes a decoder that decodes, from encoded compression data for a plurality of divided blocks, information of a direction of intra-picture prediction to be used in intra-picture prediction of a target block to be decoded and a compressed residual signal, a prediction signal generator that generates an intra-picture prediction signal using the information of the direction of the intra-picture prediction and previously reconstructed reference samples located adjacent to the target block, a residual signal restorator that restores a reconstructed residual signal of the target block from the compressed residual signal, and a block storage that restores a pixel signal of the target block by adding the prediction signal to the reconstructed residual signal, and stores the restored pixel signal of the target block to be used as reference samples. The prediction signal generator derives reference samples from previously reconstructed blocks, stored in the block storage, which neighbour the target block, selects two or more key reference samples from the reference samples, performs an interpolation process between the key reference samples for generating interpolated reference samples, and generates the intra-picture prediction signal by extrapolating the interpolated reference samples based on the direction of the intra-picture prediction.

In the moving picture prediction decoding device described above, the prediction signal generator may selectively carry out an interpolation process of the reference samples or a smoothing process of the reference samples, based on a comparison between the key reference samples and a predetermined threshold.

In the moving picture prediction decoding device described above, the reference samples may be such reference samples as located at the end of a reference sample group, and the interpolation process may be a bilinear interpolation process performed on the reference samples between the key reference samples.

The present invention may be taken as relating to a moving picture prediction encoding method, to a moving picture prediction decoding method, to a moving picture prediction encoding program, and to a moving picture prediction decoding program, and can be described as follows.

A moving picture prediction encoding method according to an aspect of the present invention is executed by a moving picture prediction encoding device. The moving picture prediction encoding method includes a block division step of dividing an input image into a plurality of blocks, a prediction signal generation step of generating, using previously reconstructed reference samples located adjacent to a target block to be encoded among the divided blocks from the block division step, an intra-picture prediction signal of a block having a higher correlation with the target block previously reconstructed, a residual signal generation step of generating a residual signal between the prediction signal of the target block and the pixel signal of the target block, a residual signal compression step of compressing the residual signal generated in the residual signal generation step, a residual signal restoration step of generating a reconstructed residual signal by restoring the compressed residual signal, an encoding step of encoding the compressed residual signal, and a block storage step of restoring the pixel signal of the target block by adding the prediction signal to the reconstructed residual signal, and storing the restored pixel signal of the target block to be used as reference samples. In the prediction signal generation step, reference samples are derived from previously reconstructed blocks, which are stored and neighbour the target block, two or more key reference samples are selected from the reference samples, an interpolation process is performed between the key reference samples for generating interpolated reference samples, a direction of intra-picture prediction is determined, and the intra-picture prediction signal is generated by extrapolating the interpolated reference samples based on the determined direction of the intra-picture prediction. In the encoding step, information of the direction of the intra-picture prediction is encoded together with the compression data of the residual signal.

A moving picture prediction decoding method according to an aspect of the present invention is executed by a moving picture prediction decoding device. The moving picture prediction decoding method includes a decoding step of decoding, from encoded compression data for a plurality of divided blocks, information of a direction of intra-picture prediction to be used in intra-picture prediction of a target block to be decoded and a compressed residual signal, a prediction signal generation step of generating an intra-picture prediction signal using the information of the direction of the intra-picture prediction and previously reconstructed reference samples located adjacent to the target block, a residual signal restoration step of restoring a reconstructed residual signal of the target block from the compressed residual signal, and a block storage step of restoring a pixel signal of the target block by adding the prediction signal to the reconstructed residual signal, and storing the restored pixel signal of the target block to be used as reference samples. In the prediction signal generation step, reference samples are derived from previously reconstructed blocks, which are stored and neighbour the target block, two or more key reference samples are selected from the reference samples, an interpolation process is performed between the key reference samples for generating interpolated reference samples, and the intra-picture prediction signal is generated by extrapolating the interpolated reference samples based on the direction of the intra-picture prediction.

A moving picture prediction encoding program according to an aspect of the present invention causes a computer to function as a block divider that divides an input image into a plurality of blocks, a prediction signal generator that generates, using previously reconstructed reference samples located adjacent to a target block to be encoded among the divided blocks from the block divider, an intra-picture prediction signal of a block having a higher correlation with the target block previously reconstructed, a residual signal generator that generates a residual signal between the prediction signal of the target block and the pixel signal of the target block, a residual signal compressor that compresses the residual signal generated by the residual signal generator, a residual signal restorator that generates a reconstructed residual signal by restoring the compressed residual signal, an encoder that encodes the compression data of the residual signal, and a block storage that restores the pixel signal of the target block by adding the prediction signal to the reconstructed residual signal, and stores the restored pixel signal of the target block to be used as the reference sample. The prediction signal generator derives reference samples from previously reconstructed blocks, stored in the block storage, which neighbour the target block, selects two or more key reference samples from the reference samples, performs an interpolation process between the key reference samples for generating interpolated reference samples, determines a direction of intra-picture prediction, and generates the intra-picture prediction signal by extrapolating the interpolated reference samples based on the determined direction of the intra-picture prediction. The encoder encodes information of the direction of intra-picture direction together with the compression data of the residual signal.

A moving picture prediction decoding program according to an aspect of the present invention causes a computer to function as a decoder that decodes, from encoded compression data for a plurality of divided blocks, information of a direction of intra-picture prediction to be used in intra-picture prediction of a target block to be decoded and a compressed residual signal, a prediction signal generator that generates an intra-picture prediction signal using the information of the direction of the intra-picture prediction and previously reconstructed reference samples located adjacent to the target block, a residual signal restorator that restores a reconstructed residual signal of the target block from the compressed residual signal, and a block storage that restores the pixel signal of the target block by adding the prediction signal to the reconstructed residual signal, and stores the restored pixel signal of the target block to be used as reference samples. The prediction signal generator derives reference samples from previously reconstructed blocks, stored in the block storage, which neighbour the target block, selects two or more key reference samples from the reference samples, performs an interpolation process between the key reference samples for generating interpolated reference samples, and generates the intra-picture prediction signal by extrapolating the interpolated reference samples based on the direction of the intra-picture prediction.

Effects of the Invention

With the filter process applied on the reference samples by bilinear interpolation in accordance with the present invention, the signals in the reference samples are made gradually changed using samples at both ends of the reference samples, thereby suppressing such artificial noise as contouring artifacts.

DETAILED DESCRIPTION OF THE PREFERRED EMBODIMENTS

Embodiments of the present invention will be described below with reference to FIG. 1 to FIG. 7 and FIG. 13 to FIG. 17.

Figure 1:
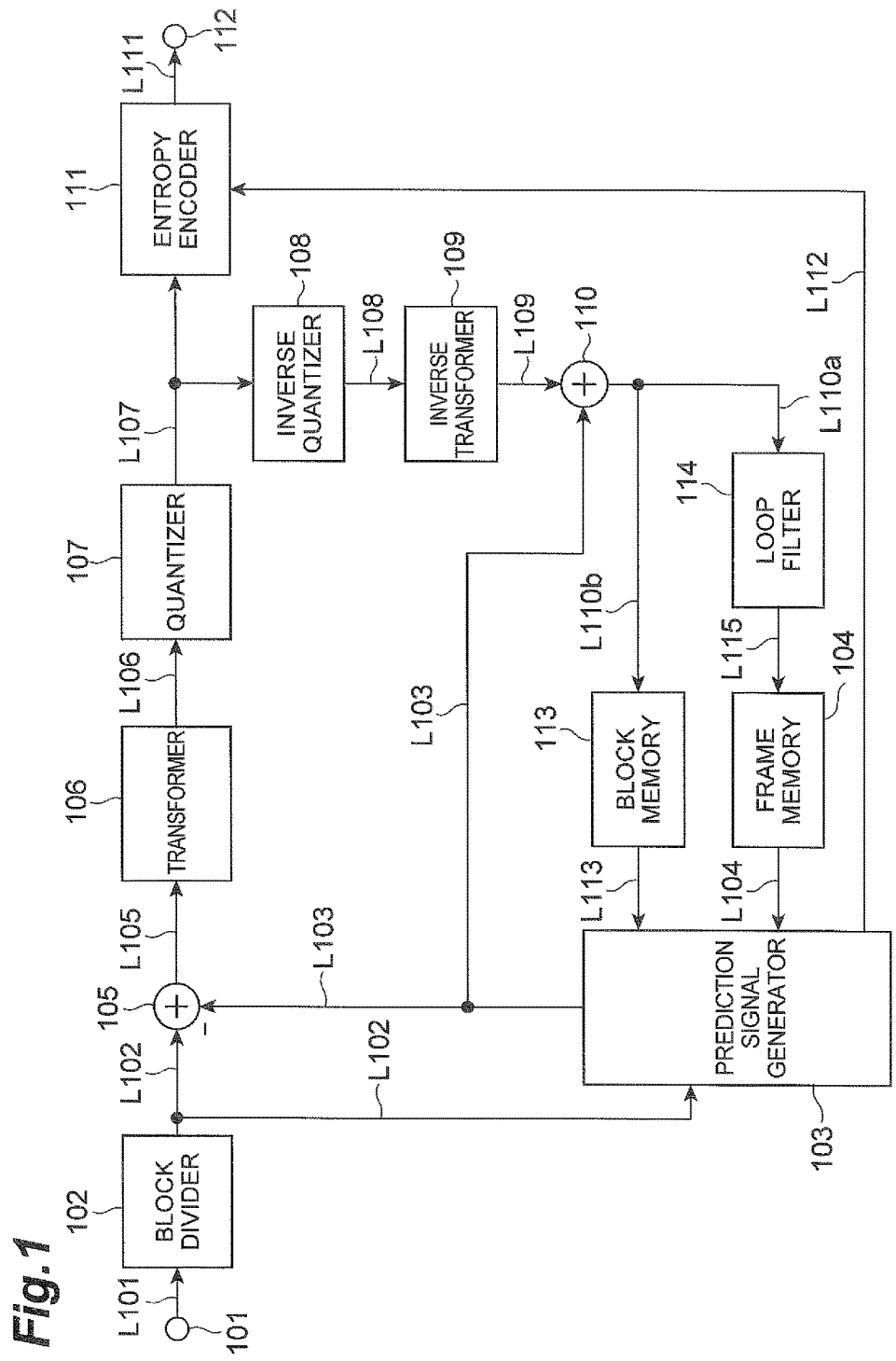
FIG. 1 is a block diagram showing a moving picture prediction encoding device according to an embodiment of the present invention.

FIG. 1 is a block diagram showing a moving picture prediction encoding device 100 according to an embodiment of the present invention. As shown in FIG. 1, the moving picture prediction encoding device 100 includes an input terminal 101, a block divider 102, a prediction signal generator 103, a frame memory 104, a subtractor 105, a transformer 106, a quantizer 107, an inverse quantizer 108, an inverse transformer 109, an adder 110, an entropy encoder 111, an output terminal 112, a block memory 113, and a loop filter 114. The subtractor 105, the transformer 106, and the quantizer 107 function as "an encoder" recited in the claims. The inverse quantizer 108, the inverse transformer 109, and the adder 110 function as "a decoder" recited in the claims. The frame memory 104 functions as "an image storage", and the block memory 113 functions as "a block storage".

The operation of the moving picture prediction encoding device 100 configured as described above is described below. The signal of a moving picture composed of a plurality of images is input to the input terminal 101. The block divider 102 divides an image to be encoded into a plurality of regions. In the embodiment according to the present invention, as shown in the example in FIG. 7, the block size is not limited. A variety of block sizes and shapes may be coincidently defined in a picture. The block encoding order is described, for example, in Non Patent Literature 1. Next, a prediction signal is generated for a region (hereinafter called "target block"). In the embodiment according to the present invention, two types of prediction methods are used, namely, inter-picture prediction and intra-picture prediction. The prediction signal generation process in the prediction signal generator 103 is described later using FIG. 13.

The subtractor 105 subtracts a prediction signal (through a line L103) from the signal of a target block (through a line L102) to generate a residual signal. The transformer 106 discrete-cosine transforms the residual signal. The quantizer 107 quantizes each transform coefficient. The entropy encoder 111 encodes the quantized transform coefficients and outputs, to the output terminal 112, the encoded transform coefficients along with prediction information required to generate a prediction signal.

In order to perform the intra-picture prediction or the inter-picture prediction on the subsequent target block, the compressed signal of the target block is inversely processed and decoded. More specifically, the quantized transform coefficients are inverse quantized by the inverse quantizer 108 and thereafter inversely discrete-cosine transformed by the inverse transformer 109, whereby the residual signal is reconstructed. The adder 110 adds the reconstructed residual signal to the prediction signal sent through the line L103 to reproduce the signal of the target block. The signal of the reconstructed block is stored in the block memory 113 for intra-picture prediction. A reconstructed image formed of the reconstructed signal is stored in the frame memory 104 after a block noise suffered in the reconstructed image is removed by the loop filter 114.

Figure 13:
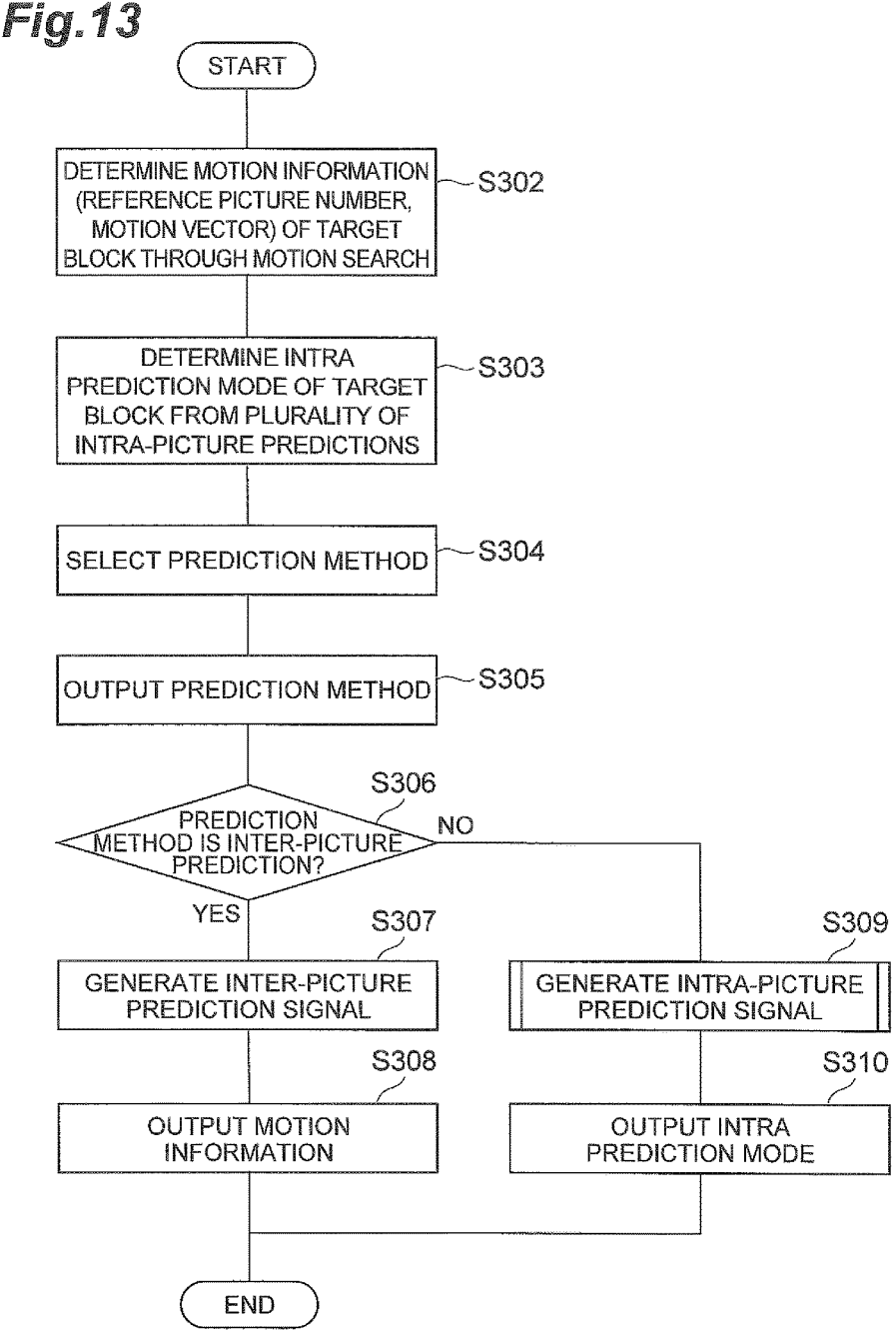
FIG. 13 is a flowchart illustrating a process in a prediction signal generator 103 in FIG. 1.

With reference to FIG. 13, the prediction signal process flow performed in the prediction signal generator 103 is explained. First, in step S302, prediction information required for inter-picture prediction is generated. Specifically, a reconstructed image that is previously encoded and thereafter reconstructed is used as a reference image. This reference image is searched for a motion vector and a reference picture that gives a prediction signal with the smallest difference from the target block. In this case, the target block is input through the line L102, and the reference image is input through a line L104. A plurality of images previously encoded and reconstructed are used as reference images. The details thereof are the same as in H.264 which is the conventional technique or method shown in Non Patent Literature 1.

Figure 7:
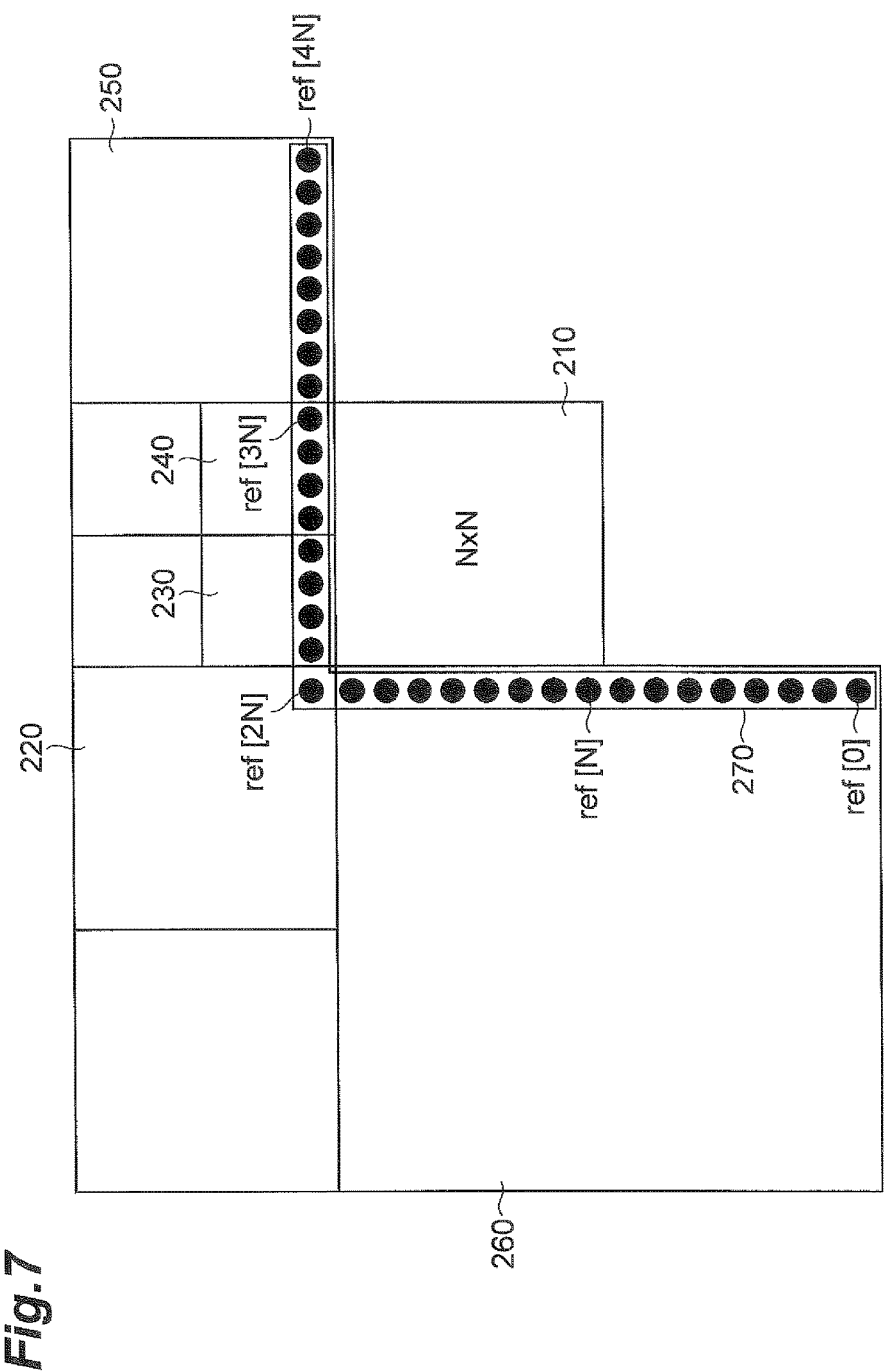
FIG. 7 is a diagram illustrating an example of reference samples used in intra-picture prediction.
Figure 8:
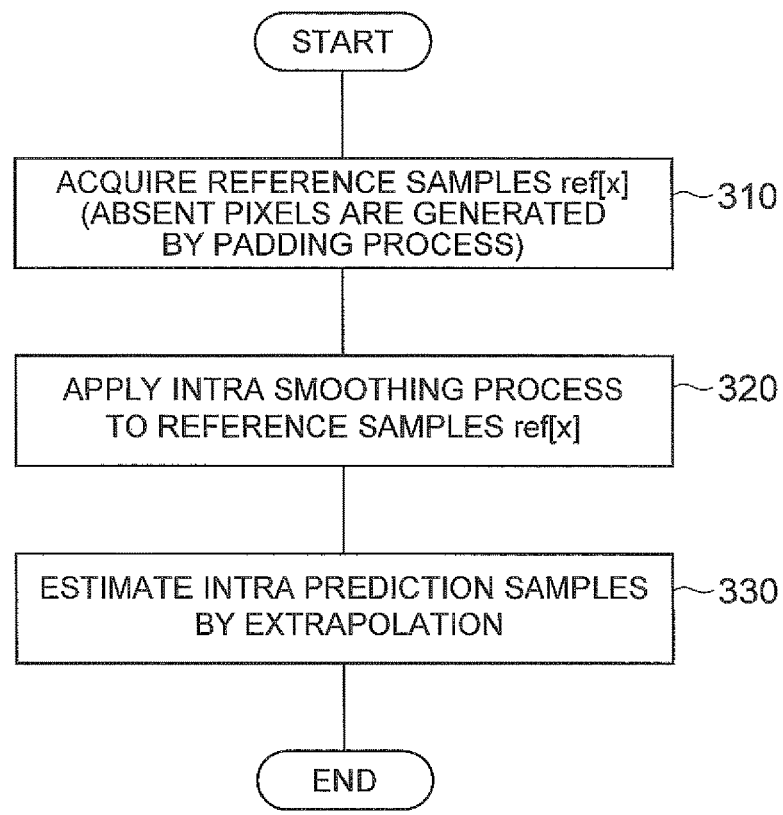
FIG. 8 is a flowchart showing an intra-picture prediction method in a conventional technique.
Figure 9:
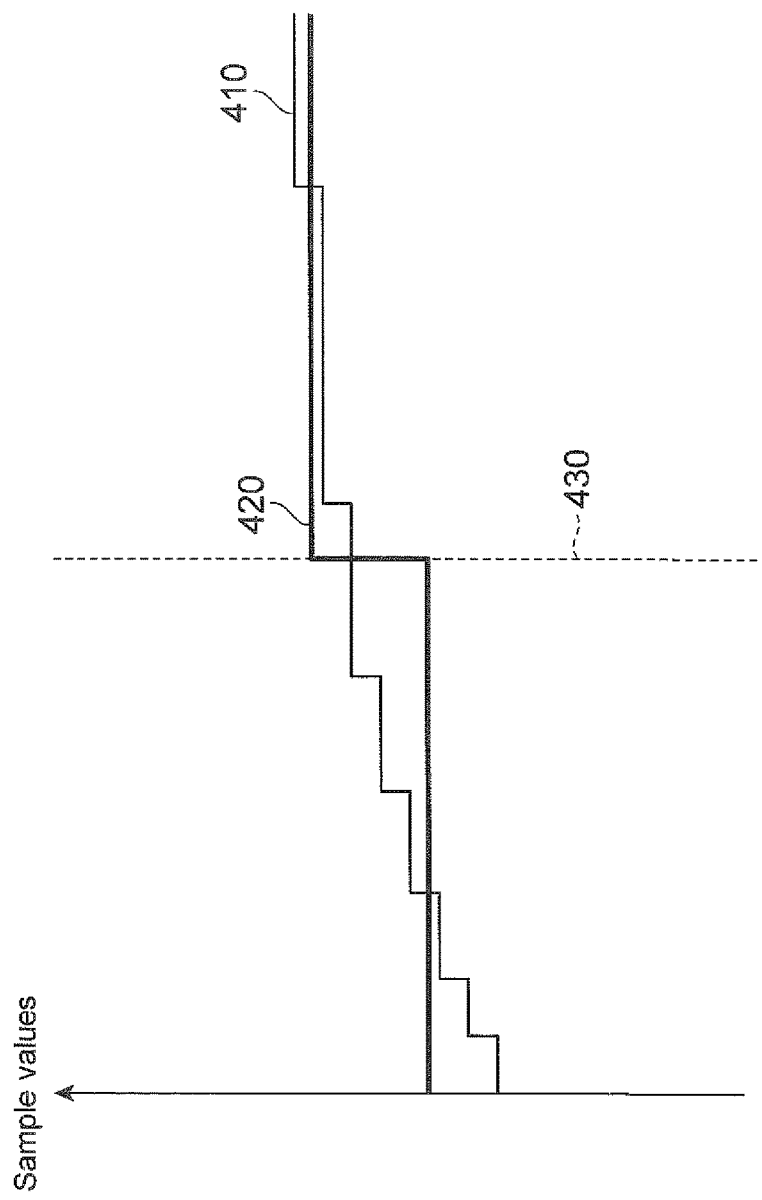
FIG. 9 is a diagram illustrating the relation between an original signal and a reconstructed signal in a flat region.
Figure 10:
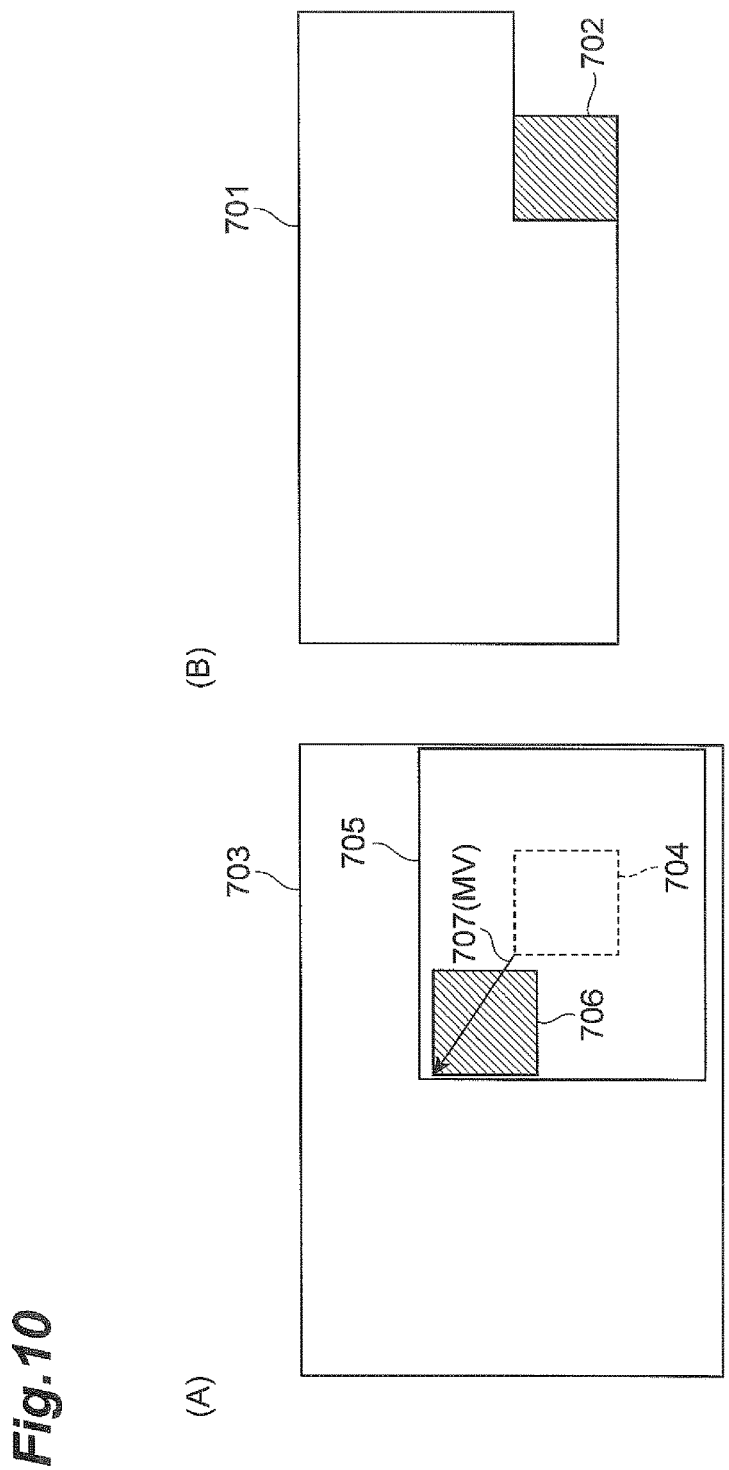
FIG. 10 is a schematic diagram for explaining a motion estimation process in inter-picture prediction.
Figure 11:
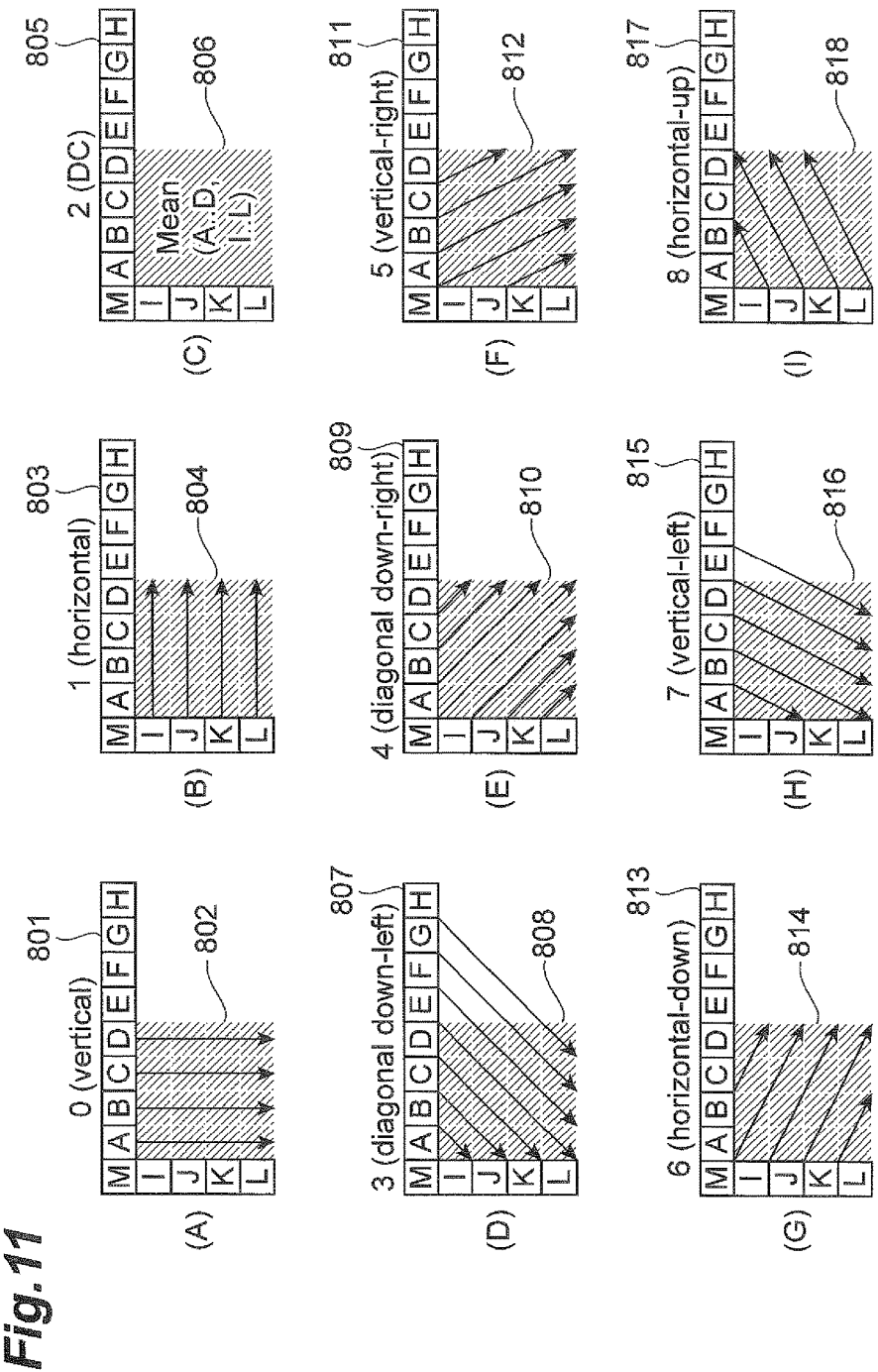
FIG. 11 is a schematic diagram for explaining intra-picture prediction by extrapolation of reference samples.

In step S303, prediction information required for intra-picture prediction is generated. As shown in FIG. 7, the previously reconstructed pixel values spatially adjacent to the target block are used to generate prediction signals in a plurality of intra-prediction directions. Then, the prediction direction (intra prediction mode) that gives a prediction signal with the smallest difference from the target block is selected. Here, the prediction signal generator 103 generates an intra-picture prediction signal by acquiring the previously reconstructed pixel signals within the same picture as reference samples from the block memory 113 through a line L113 and extrapolating these signals.

Next, in step S304, a prediction method to be applied to the target block is selected from inter-picture prediction and intra-picture prediction. For example, one of the prediction methods that gives a prediction value with a small difference from the target block is selected. Alternatively, the two prediction methods may be actually performed until the end of the encoding processing, and the one may be selected which has a smaller evaluation value calculated from the relation between the produced encoding amount and the sum of absolute values of the encoded difference images. The selection information of the selected prediction method is sent as information required to generate a prediction signal to the entropy encoder 111 through a line L112 for encoding and is then output from the output terminal 112 (step S305).

If the prediction method selected in step S306 is inter-picture prediction, a prediction signal is generated in step S307 based on motion information (the motion vector and the reference picture information). The generated inter-picture prediction signal is output to the subtractor 105 through the line L103. In step S308, the motion information is sent as the information required to generate a prediction signal to the entropy encoder 111 through the line L112 for encoding and is then output from the output terminal 112.

If the prediction method selected in step S306 is intra-picture prediction, a prediction signal is generated in step S309 based on the intra prediction mode. The generated intra-picture prediction signal is output to the subtractor 105 through the line L103. In step S310, the intra prediction mode is sent as the information required to generate a prediction signal to the entropy encoder 111 through the line L112 for encoding and is then output from the output terminal 112.

The encoding method used in the entropy encoder 111 may be arithmetic encoding or may be variable length encoding.

Figure 2:
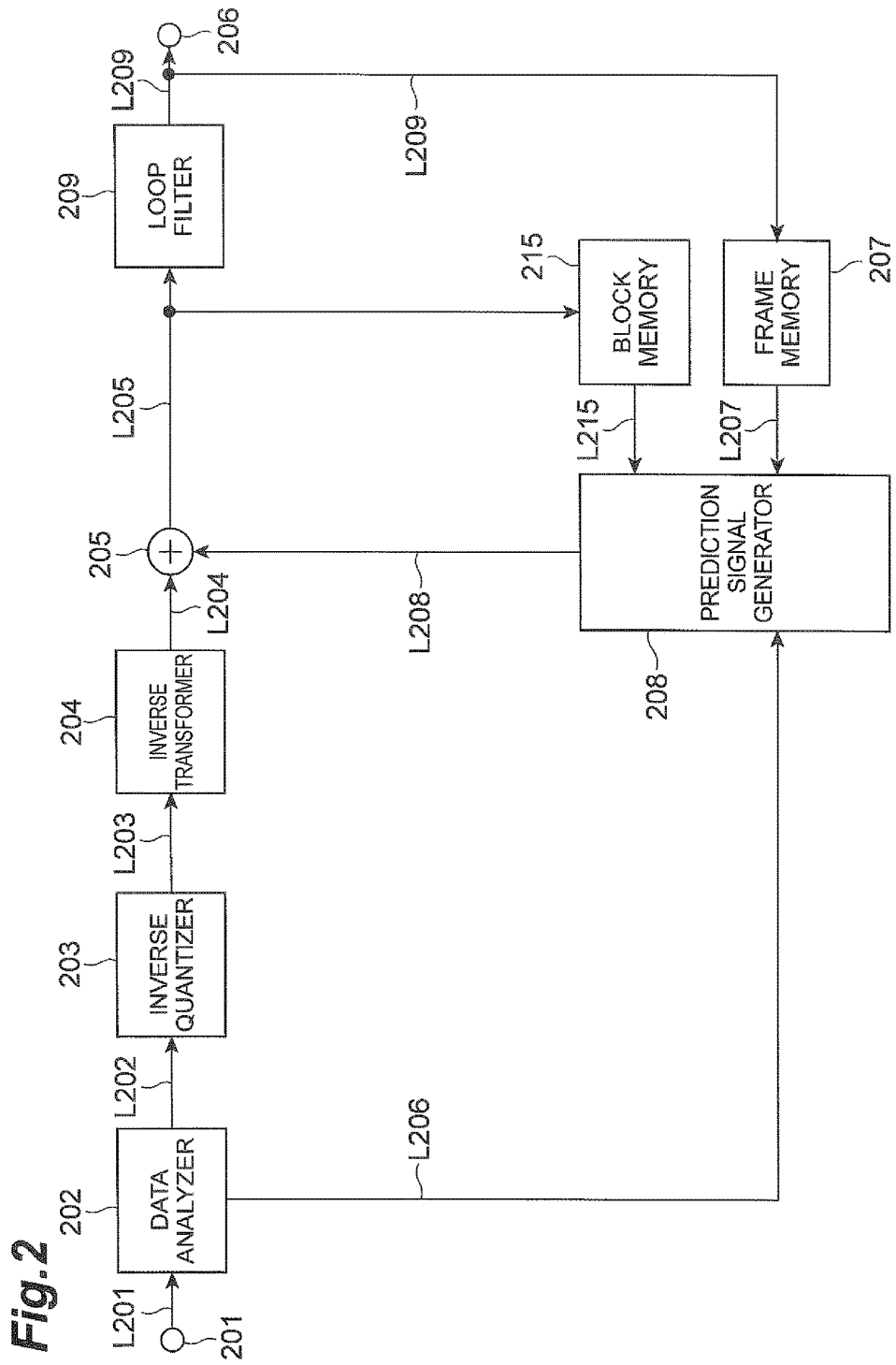
FIG. 2 is a block diagram showing a moving picture prediction decoding device according to the embodiment of the present invention.

FIG. 2 is a block diagram of a moving picture prediction decoding device 200 according to an embodiment of the present invention. As shown in FIG. 2, the moving picture prediction decoding device 200 includes an input terminal 201, a data analyzer 202, an inverse quantizer 203, an inverse transformer 204, an adder 205, a prediction signal generator 208, a frame memory 207, an output terminal 206, a loop filter 209, and a block memory 215. The inverse quantizer 203 and the inverse transformer 204 function as "a decoder" recited in the claims. Any other functional units may be used as the decoder. The inverse transformer 204 may be omitted. The frame memory 207 functions as "an image storage", and the block memory 215 functions as "a block storage".

The operation of the moving picture prediction decoding device 200 configured as described above is described below. The compressed data that is compression encoded by the method described above is input from the input terminal 201. The compressed data includes a residual signal obtained by predicting and encoding a target block of a plurality of blocks from a divided image, as well as the information required to generate a prediction signal. As shown in the example in FIG. 7, the block size is not limited. A variety of block sizes and shapes may be coincidently defined in a picture. The block decoding order is described, for example, in Non Patent Literature 1. The information required to generate a prediction signal includes the prediction method selection information and the motion information (for inter-picture prediction) or the intra prediction mode (for intra-picture prediction).

The data analyzer 202 decodes the residual signal of the target block, the information required to generate a prediction signal, and the quantization parameter from the compressed data. The inverse quantizer 203 inversely quantizes the decoded residual signal of the target block based on the quantization parameter (through a line L202). The inverse transformer 204 further inversely discrete-cosine transforms the inversely quantized residual signal. As a result, the residual signal is reconstructed. Next, the information required to generate a prediction signal is sent to the prediction signal generator 208 through a line L206. The prediction signal generator 208 generates a prediction signal of the target block based on the information required to generate a prediction signal. A process of generating a prediction signal in the prediction signal generator 208 is described later using FIG. 14. The generated prediction signal is sent to the adder 205 through a line L208 and is added to the reconstructed residual signal. The target block signal is thus reconstructed and output to the loop filter 209 through a line L205 and, at the same time, stored into the block memory 215 to be used for intra-picture prediction of subsequent blocks. The loop filter 209 removes a block noise from the reconstructed signal input through the line L205. The reconstructed image having a block noise removed is stored into the frame memory 207 as a reconstructed image to be used for decoding and reproducing subsequent images.

Figure 14:
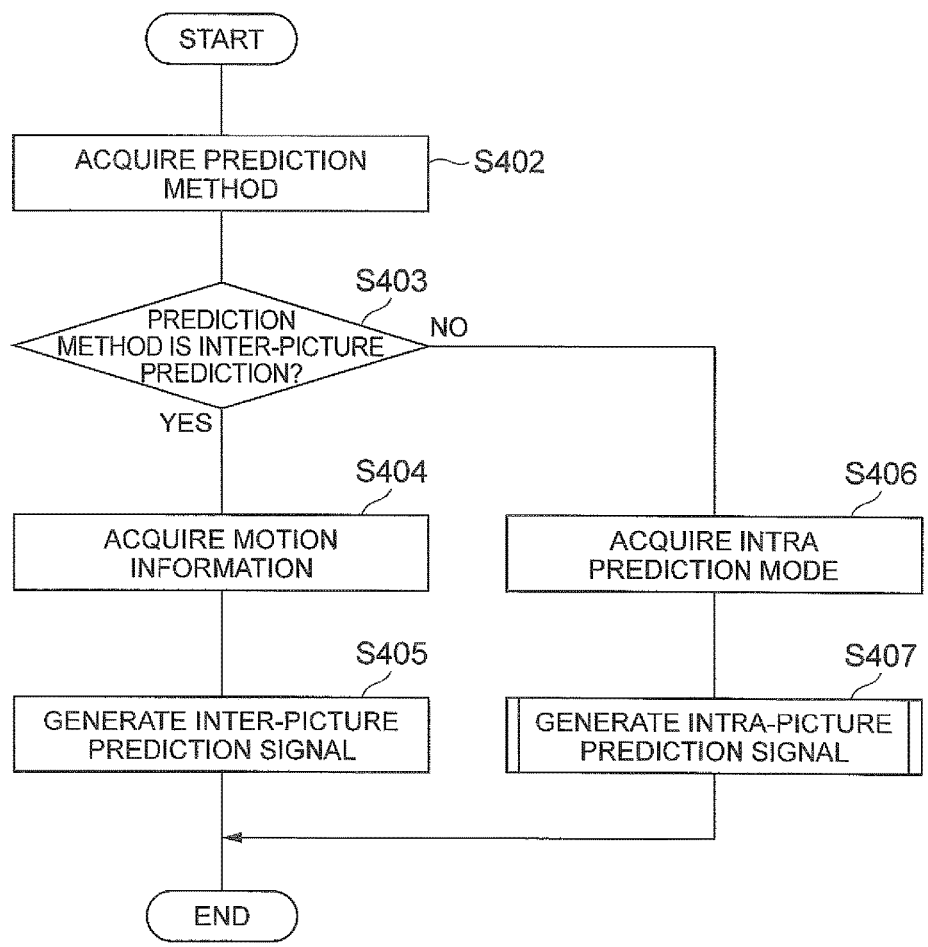
FIG. 14 is a flowchart illustrating a process in a prediction signal generator 208 in FIG. 2.

The prediction signal processing flow performed in the prediction signal generator 208 is described using FIG. 14. First, in step S402, the prediction method decoded by the data analyzer 202 is derived.

If the decoded prediction method is inter-picture prediction (step S403), the motion information (the motion vector and the reference picture information) decoded by the data analyzer 202 is derived (step S404). The frame memory 207 is accessed based on the motion information to derive a reference signal from a plurality of reference images, and a prediction signal is generated (step S405).

If the decoded prediction method is intra-picture prediction (step S403), the intra prediction mode decoded by the data analyzer 202 is derived (step S406). The block memory 215 is accessed to derive previously reconstructed pixel signals located adjacent to the target block as reference samples, and a prediction signal is generated based on the intra prediction mode (step S407). The generated prediction signal is output to the adder 205 through L208.

The decoding method used in the data analyzer 202 may be arithmetic decoding or may be variable length decoding.

Figure 3:
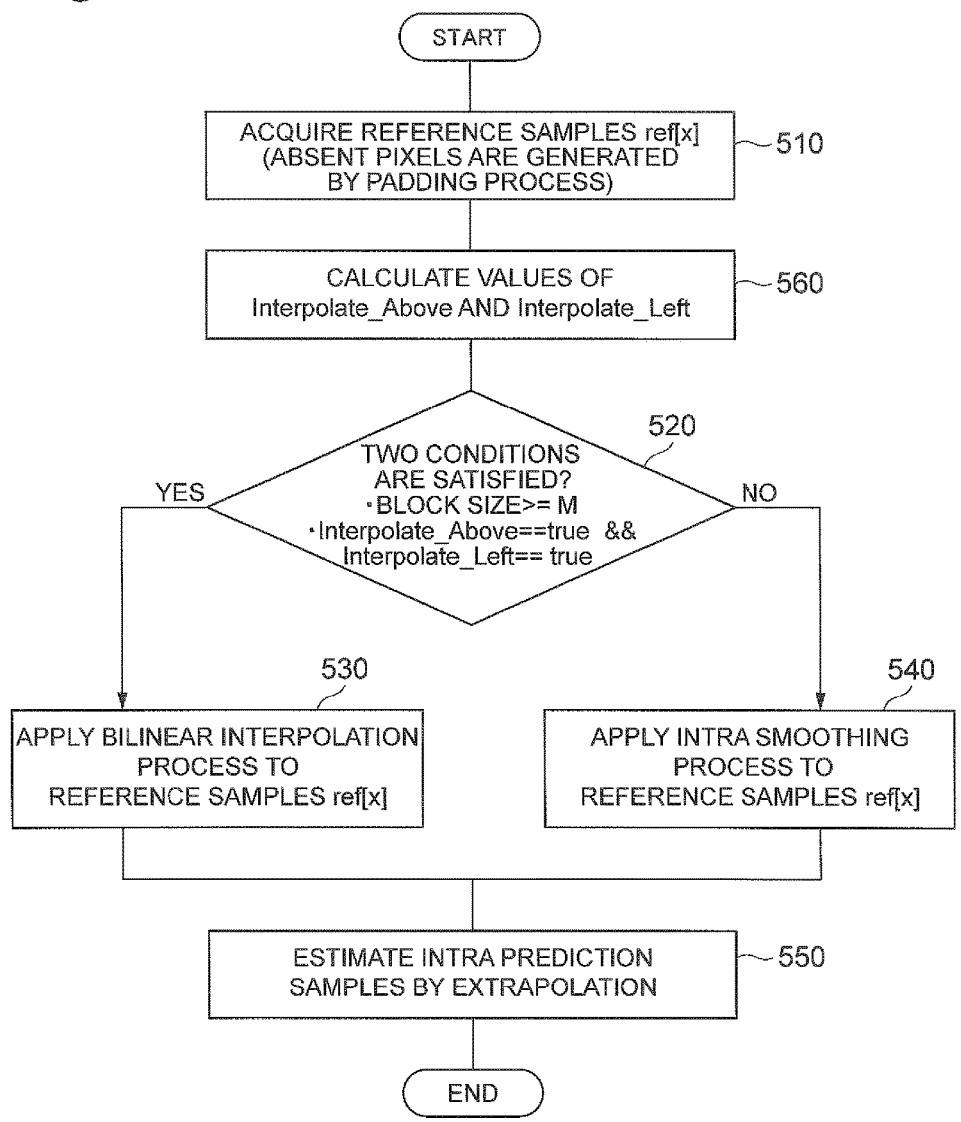
FIG. 3 is a flowchart showing an intra-picture prediction method according to the embodiment of the present invention.

Next, the intra-picture prediction method in the embodiment of the present invention is described using FIG. 3 and FIG. 7. Specifically, the details of step S309 in FIG. 13 and step S407 in FIG. 14 are described, which include a method of estimating the intra prediction samples in a target block by extrapolation based on the intra prediction mode using the reference samples derived from the block memory 113 in FIG. 1 or the block memory 215 in FIG. 2.

In the present invention, in order to suppress noise such as countouring artifacts described previously in the Technical Problem section, a bilinear interpolation process is applied to a group of reference samples used in the intra-picture prediction with respect to the block that suffers contouring artifacts. An appearance of step-like noise at the block boundary of the reference sample group is suppressed by making the signal of the reference sample group smoothly change.

The bilinear interpolation process applied to the reference sample group is described using FIG. 7. When a target block 210 has a block size of N×N samples, the neighbouring reference sample group 270 of 4N+1 reference samples (ref[x] (x=0 to 4N)) is formed with the previously reconstructed signals belonging to five previously reconstructed blocks 220, 230, 240, 250, and 260. In the present embodiment, three reference samples located at the ends of the reference sample 270, namely, the bottom-left reference sample BL=ref[0] and the above-right reference sample AR=ref[4N], and the above-left reference sample AL=ref[2N] located at the center of the reference sample group 270 and to the above left of the target block are defined as key reference samples of bilinear interpolation. Here, the 4N+1 reference samples are interpolated as follows.

$$\text{ref'}[0]=\text{ref}[0] \quad (1)$$

$$\text{ref'}[i]=BL+(i*(AL-BL)+N)/2N \ (i=1 \text{ to } 2N-1) \quad (2)$$

$$\text{ref'}[2N]=\text{ref}[2N] \quad (3)$$

$$\text{ref'}[2N+i]=AL+(i*(AR-AL)+N)/2N \ (i=1 \text{ to } 2N-1) \quad (4)$$

$$\text{ref'}[4N]=\text{ref}[4N] \quad (5)$$

where, ref'[x] (x=0 to 4N) represents the values of the interpolated reference samples. Equations (2) and (4) may be transformed to Equation (2)' and (4)', respectively.

$$\text{ref'}[i]=((2N-i)*BL+i*AL+N)/2N \ (i=1 \text{ to } 2N-1) \quad (2)'$$

$$\text{ref'}[2N+i]=((2N-i)*AL+i*AR+N)/2N \ (i=1 \text{ to } 2N-1) \quad (4)'$$

The reference sample values between BL and AL are generated with key reference samples BL and AL by bilinear interpolation, and the reference sample values between AL and AR are generated with key reference samples AL and AR by bilinear interpolation, resulting in that the levels of the interpolated reference samples values are made smoothly changed. As a result, propagation of block noise to the prediction signal can be suppressed.

Next, the criteria for determining whether the bilinear interpolation should be applied to the reference samples are described using FIG. 7. In the present embodiment, the determination is made using the three key reference samples and two reference samples at the block boundary, and two thresholds. THRESHOLD_ABOVE and THRESHOLD_LEFT are thresholds used in determining whether the bilinear interpolation should be applied to the reference samples ref[x] (x=2N+1 to 4N−1) on the upper position and the reference samples ref[x] (x=1 to 2N−1) on the left position, respectively, with respect to the target block. The bilinear interpolation is applied to the reference sample that satisfies the determination criteria.

In the present embodiment, the determination criteria below are used. Interpolate_Above and Interpolate_Left in the two equations below are Boolean values. When the right side is satisfied, true (1) holds, and the bilinear interpolation is applied. When the right side is not satisfied, false (0) holds, and intra smoothing by the conventional 121 filter is applied.

$$\text{Interpolate\_Left}=\text{abs}(BL+AL-2*\text{ref}[N])<\text{THRESHOLD\_LEFT} \quad (6)$$

$$\text{Interpolate\_Above}=\text{abs}(AL+AR-2*\text{ref}[3N])<\text{THRESHOLD\_ABOVE} \quad (7)$$

When the values of BL, AL, and ref[3N] are on a straight line, the value of BL+AL−2*ref[N] is zero. Similarly, when the values of AL, AR, and ref[3N] are on a straight line, the value of AL+AR−2*ref[3N] is also zero. In other words, the two equations above compare the magnitude of deviation of ref[N] from the straight line connecting BL and AL and the magnitude of deviation of ref[3N] from the straight line connecting AL and AR, with the respective thresholds. If the calculated two deviations are smaller than the corresponding threshold THRESHOLD_ABOVE or THRESHOLD_LEFT, the Boolean value (Interpolate_Above or Interpolate_Left) is true, and the bilinear interpolation is applied to the reference sample. In Equations (6) and (7), abs(x) calculates the absolute value of x.

The values of the two thresholds (THRESHOLD_ABOVE and THRESHOLD_LEFT) may be preset to fixed values, or may be encoded for each frame or for each slice having a plurality of blocks together, and decoded by the decoder. The values of the two thresholds may be encoded for each block and decoded by the decoder. In FIG. 2, the two thresholds are decoded by the data analyzer 202 and output to the prediction signal generator 208 for use in generating an intra-picture prediction signal detailed below in FIG. 3 and FIG. 4.

FIG. 3 shows a flowchart of a process of estimating the intra prediction samples by extrapolation (in the directions of intra-picture prediction). First, in step S510, the prediction signal generator (103 or 208, the reference numeral is hereinafter omitted) derives the reference samples ref[x] (x=0 to 4N) as shown in the pixel group 270 in FIG. 7 from the block memory (113 or 215, the reference numeral is hereinafter omitted). If the neighbouring blocks have not yet been reconstructed because of the encoding order or other reasons, and all of the 4N+1 samples cannot be derived, the missing samples are substituted by the padding process (the values of the neighbouring samples are copied), whereby 4N+1 reference samples are prepared. The details of the padding process are described in Non Patent Literature 1. Next, in step 560, two Boolean values Interpolate_Above and Interpolate_Left are calculated with Equations (6) and (7).

Next, in step 520, the prediction signal generator determines whether the target block satisfies the determination criteria for applying the bilinear interpolation. Specifically, it is determined whether the size of the target block is greater than a predetermined M, and it is also determined whether the calculated Interpolate_Above and Interpolate_Left are both true. The reason why the block size is set as a determination criterion is because the problem of contouring artifacts is likely to occur in a block of a large size. The test for determining whether the size of a block is larger than the large value M helps avoid performing unnecessary changes to the reference samples.

If the two determination criteria are satisfied (block size >=M and Interpolate_Above=true and Interpolate_Left=true), the process proceeds to step 530. If not satisfied, the process proceeds to step 540. In step 530, the bilinear interpolation process shown by Equations (1) to (5) is applied to the reference samples ref[x] (x=0 to 4N) to generate the interpolated reference samples ref'[x] (x=0 to 4N). In step 540, according to Equations (8) and (9), intra smoothing by the 121 filter is applied to the reference samples ref[x] (x=0 to 4N).

$$ref'[i]=ref[i] \ (i=0 \text{ and } 4N) \tag{8}$$

$$ref'[i]=(ref[i-1]+2*ref[i]+ref[i+1]+2)/4 \ (i=1 \text{ to } 4N-1) \tag{9}$$

where ref'[x] (x=0 to 4N) represents the values of the smoothed reference samples.

Finally, in step 550, the intra prediction samples of the target block are estimated by extrapolation (in the direction of intra-picture prediction) using the already determined intra prediction mode and the interpolated or smoothed reference samples ref'[x] (x=0 to 4N).

Figure 4:
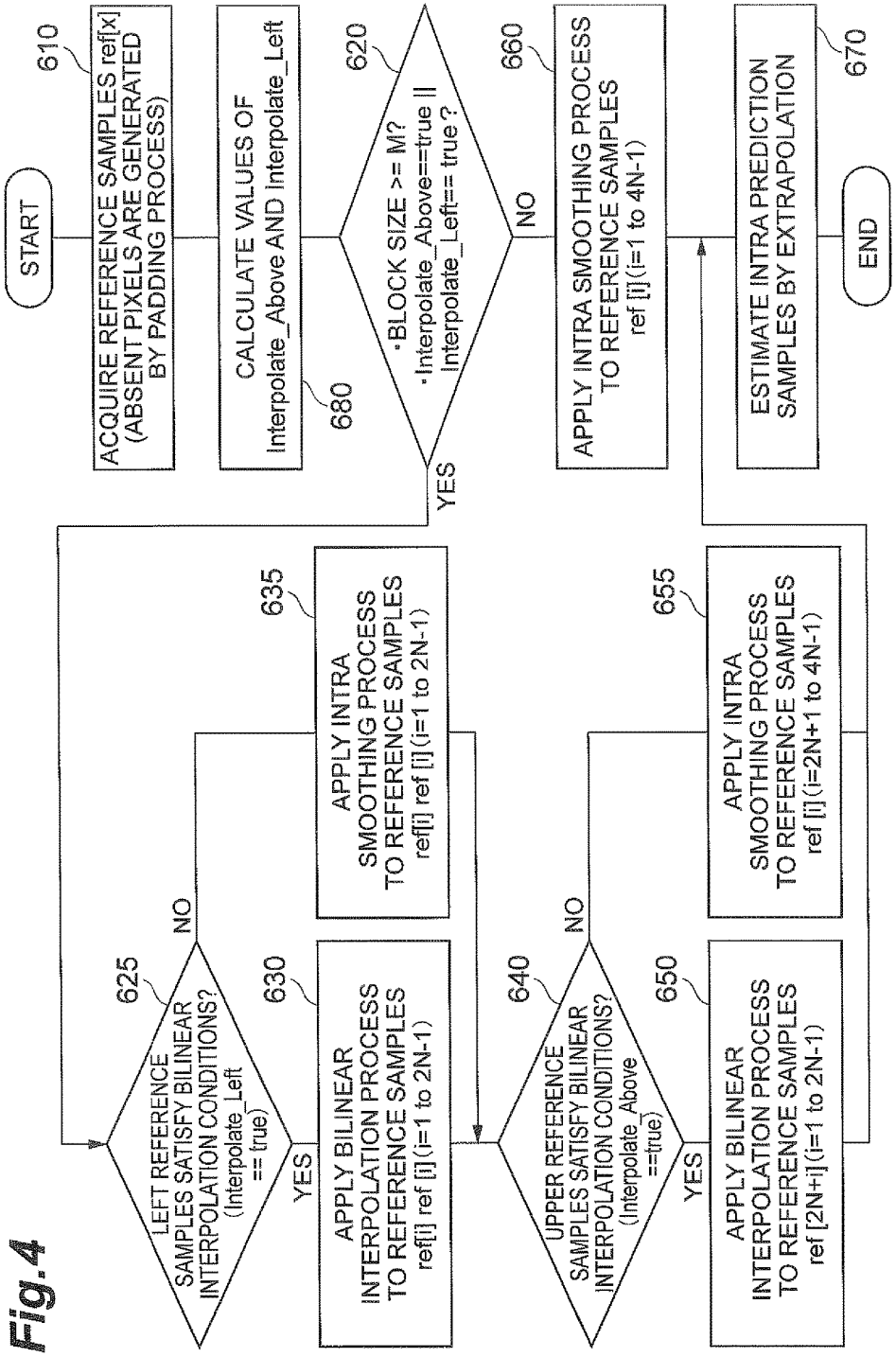
FIG. 4 is a flowchart showing another example of the intra-picture prediction method according to the embodiment of the present invention.

FIG. 4 further illustrates the details of FIG. 3 and shows a flowchart of a process of estimating the intra prediction sample by extrapolation (in the direction of intra-picture prediction) in a case where the switching between the bilinear interpolation and the 121 filter is carried out separately and independently for the left reference samples (ref[x], x=0 to 2N) and the upper reference samples (ref[x], x=2N to 4N). First, in step 610, the prediction signal generator (103 or 208, the reference numeral is hereinafter omitted) derives reference samples ref[x] (x=0 to 4N) as shown in the pixel group 270 in FIG. 7 from the block memory (113 or 215, the reference numeral is hereinafter omitted). If the neighbouring blocks have not yet been reconstructed because of the encoding order or other reasons, and all the 4N+1 reference samples cannot be derived, the missing samples are substituted by the padding process (the values of the neighbouring samples are copied), whereby 4N+1 reference samples are prepared. The details of the padding process are described in Non Patent Literature 1.

Next, in step 680, the two Boolean values Interpolate_Above and Interpolate_Left are calculated with Equations (6) and (7).

Next, in step 620, the prediction signal generator determines whether the target block satisfies the criteria for applying the bilinear interpolation. Specifically, it is determined whether the size of the target block is greater than the predetermined value M, and it is also determined whether at least one of the calculated Interpolate_Above and Interpolate_Left is true. If these two determination criteria are satisfied (block size >=M and Interpolate_Above==true or Interpolate_Left==true), the process proceeds to step 625. If not satisfied, the process proceeds to step 660. In step 660, intra smoothing by the 121 filter is applied to the reference sample group with Equations (8) and (9).

In step 625, it is determined whether the determination criterion, as shown in Equation (6), for applying the bilinear interpolation for the left reference samples is satisfied. Specifically, if Interpolate_Left is true (1), the process proceeds to step 630, and the bilinear interpolation process shown in Equations (1) and (2) is applied to the reference samples ref[x] (x=0 to 2N) to generate the interpolated reference samples ref'[x] (x=0 to 2N). If the determination criterion in Equation (6) is not satisfied, the process proceeds to step 635, and intra smoothing by the 121 filter is applied to the left reference samples ref[x] (x=0 to 2N) with Equations (10) and (11).

$$ref'[0]=ref[0] \tag{10}$$

$$ref'[i]=(ref[i-1]+2*ref[i]+ref[i+1]+2)/4 \ (i=1 \text{ to } 2N-1) \tag{11}$$

where ref'[x] (x=0 to 2N) represents the values of the smoothed reference samples.

Next, in step 640, it is determined whether the determination criterion, as shown in Equation (7), for applying the bilinear interpolation for the upper reference samples is satisfied. Specifically, if Interpolate_Above is true (1), the process proceeds to step 650, and the bilinear interpolation process is applied to the upper reference samples ref[i] (i=2N+1 to 4N) with Equations (3), (4), and (5). If the determination criterion in Equation (7) is not satisfied, the process proceeds to step 655, and intra smoothing by the 121 filter is applied to the upper reference samples ref[x] (x=2N+1 to 4N) based on Equations (12), (13), and (14).

$$ref'[2N]=ref[2N] \tag{12}$$

$$ref'[i]=(ref[i-1]+2*ref[i]+ref[i+1]+2)/4 \ (i=2N+1 \text{ to } 4N-1) \tag{13}$$

$$ref'[4N]=ref[4N] \tag{14}$$

where ref'[x] (x=2N+1 to 4N) represents the values of the smoothed reference values.

Finally, in step 670, the intra prediction samples of the target block are estimated by extrapolation (in the direction of intra-picture prediction) using the already determined intra prediction mode and the interpolated or smoothed reference samples ref'[x] (x=0 to 4N). For extrapolation, when a line is projected in the direction of intra prediction toward the interpolated or smoothed reference samples from the position of the sample in the target block to be extrapolated, the interpolated or smoothed reference samples that are located close to the projected line are used.

A moving picture prediction encoding program for causing a computer to function as the moving picture prediction encoding device 100 described above can be provided in a recording medium. Similarly, a moving picture prediction decoding program for causing a computer to function as the moving picture prediction decoding device 200 described above can be provided in a recording medium. Examples of the recording medium include a recording medium such as a USB memory, a flexible disk, a CD-ROM, a DVD, or a ROM, and a semiconductor memory.

Figure 16:
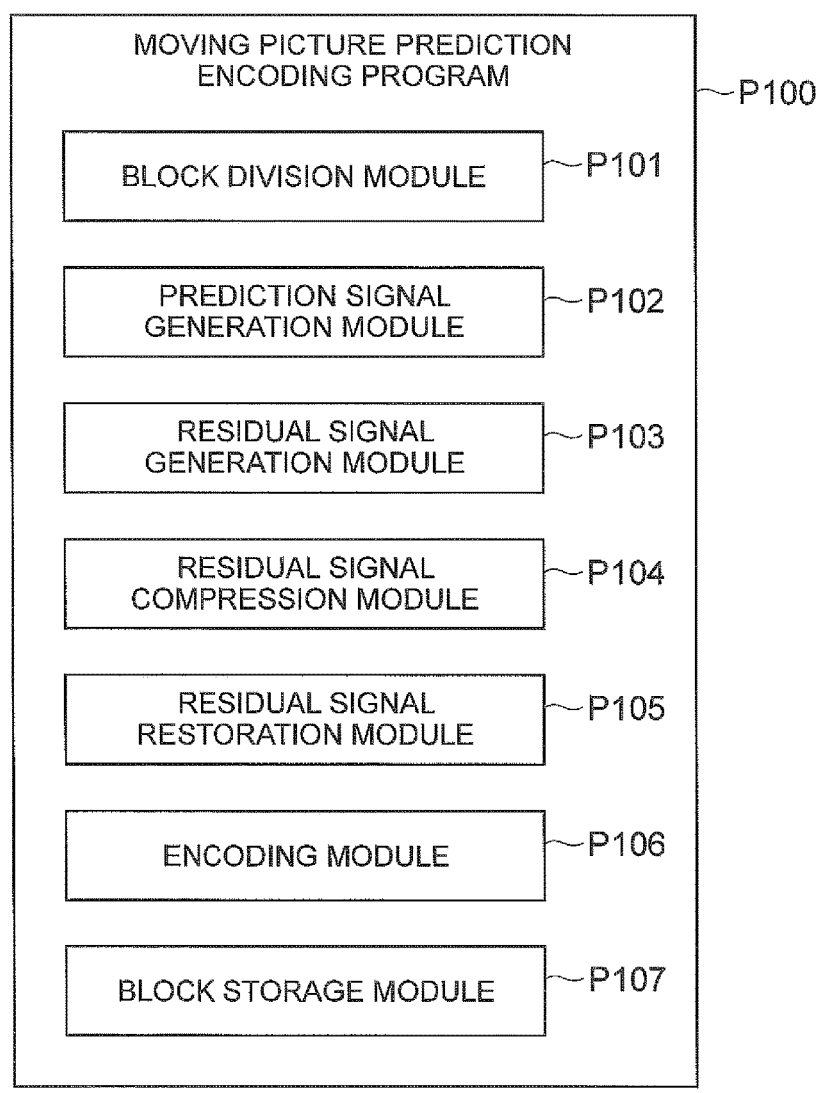
FIG. 16 is a block diagram showing a configuration of a moving picture prediction encoding program.

For example, as shown in FIG. 16, a moving picture prediction encoding program P100 includes a block division module P101, a prediction signal generation module P102, a residual signal generation module P103, a residual signal compression module P104, a residual signal restoration module P105, an encoding module P106, and a block storage module P107.

Figure 17:
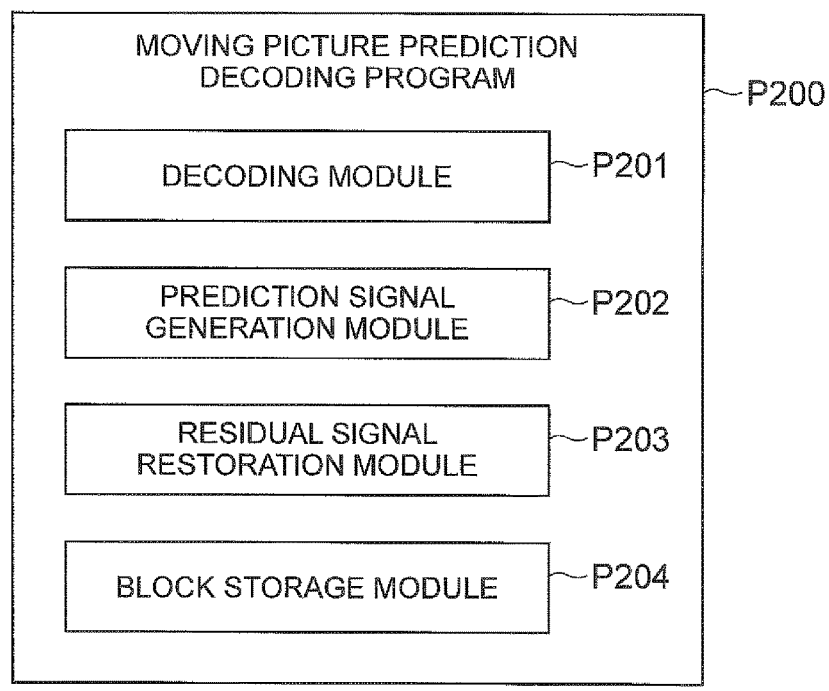
FIG. 17 is a block diagram showing a configuration of a moving picture prediction decoding program.

For example, as shown in FIG. 17, a moving picture prediction decoding program P200 includes a decoding module P201, a prediction signal generation module P202, a residual signal restoration module P203, and a block storage module P204.

The moving picture prediction encoding program P100 or the moving picture prediction decoding program P200 configured in this manner is stored in a recording medium 10 shown in FIG. 5 and FIG. 6 described later and is executed by a computer described later.

Figure 5:
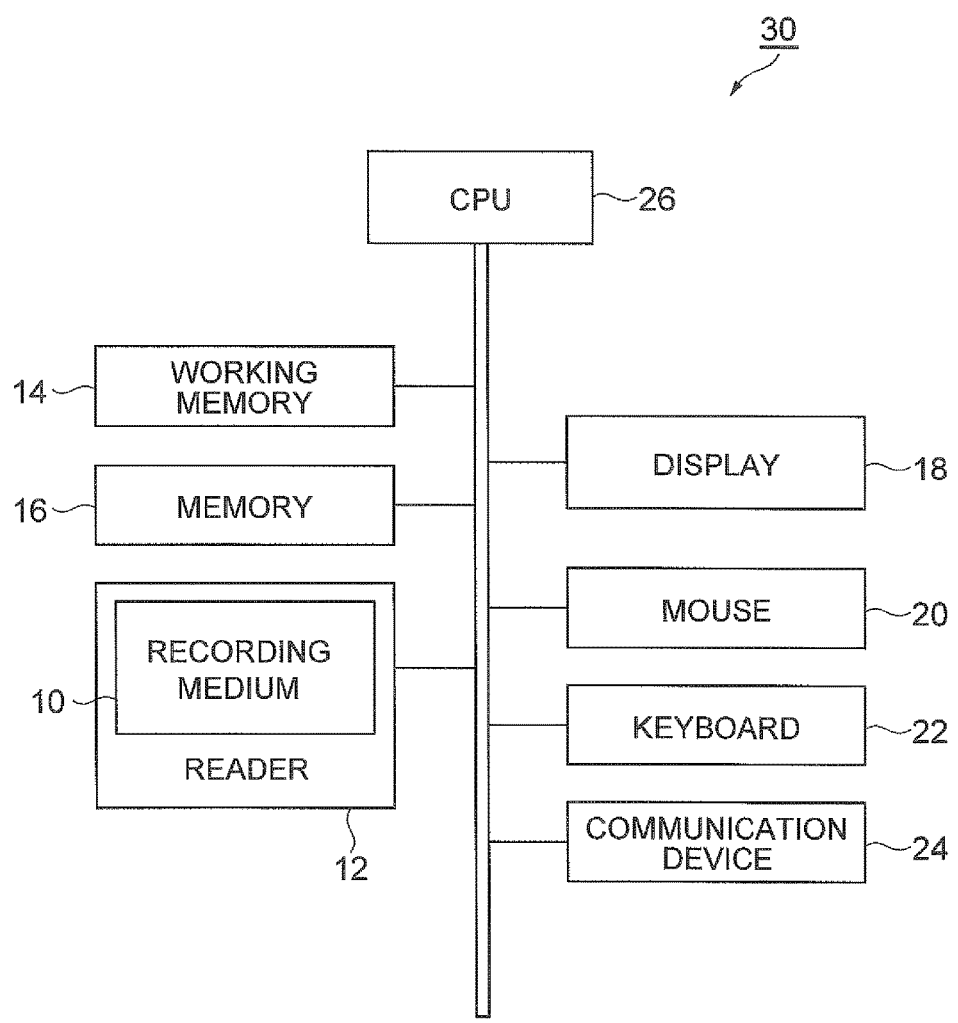
FIG. 5 is a diagram showing a hardware configuration of a computer for executing a program stored in a recording medium.
Figure 6:
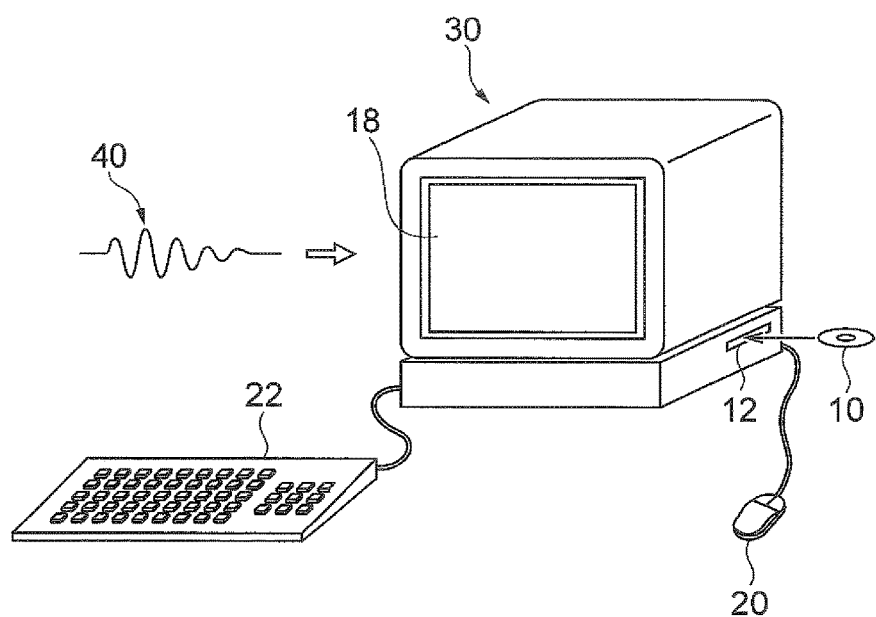
FIG. 6 is an overview of the computer for executing a program stored in a recording medium.

FIG. 5 is a diagram showing a hardware configuration of a computer 30 for executing a program stored in a recording medium, and FIG. 6 is an overview of the computer 30 for executing a program stored in a recording medium. The computer 30 referred to here broadly includes a DVD player, a set-top box, a mobile phone, and the like, which are equipped with a CPU for performing information processing or control by software.

As shown in FIG. 6, the computer 30 includes a reader 12 such as a flexible disk drive, a CD-ROM drive, or a DVD drive, a working memory (RAM) 14 having a resident Operating System, a memory 16 for storing a program stored in the recording medium 10, a display device 18 such as a display, a mouse 20 and a keyboard 22 serving as input devices, a communication device 24 for transmitting/receiving data, and a CPU 26 for controlling execution of a program. When the recording medium 10 is inserted to the reader 12, the computer 30 can access the moving picture prediction encoding program stored in the recording medium 10 from the reader 12 and can operate as the moving picture prediction encoding device 100 described above with the moving picture prediction encoding program. Similarly, when the recording medium 10 is inserted to the reader 12, the computer 30 can access the moving picture prediction decoding program stored in the recording medium 10 from the reader 12 and can operate as the moving picture prediction decoding device 200 described above with the moving picture prediction decoding program.

The present invention may take the following modifications:

(A) Determination Criteria for Applying Bilinear Interpolation

The determination criteria for applying the bilinear interpolation are not limited to the method discussed in the foregoing embodiment. For example, supposing that the result of determination for applying interpolation is always true, steps 520, 620, 625, and 640 may be omitted. In this case, the interpolation process is always applied in place of the smoothing process by the 121 filter.

The intra prediction mode may be added to the determination criteria. For example, contouring artifacts at the block boundary are alleviated by a block noise removing process, and therefore, the result of determination for applying the interpolation process may be always false when the prediction direction of the extrapolation process is vertical or horizontal.

The block size test may be eliminated from the determination criteria. The correlation of block size between the target block and the neighbouring block may be used as a determination criterion in place of the block size of the target block. In the example in FIG. 7, the block size of the block 260 located adjacent on the left of the target block 210 is larger than the target block 210. In this case, a block noise does not occur around ref[N]. When the block size of the neighbouring block is larger than the target block in this manner, the determination criterion for applying interpolation may be false irrespective of the result in Equation (6) or (7). On the other hand, the blocks 230, 240, and 250 located adjacent above the target block 210 are smaller than the target block 210. In this case, interpolation application is determined depending on the result of Equation (6) or (7) because it is possible that a block noise occurs around ref[3N] or ref[2N+N/2]. The correlation in block size between the target block and the neighbouring block may be used as a determination criterion together with the block size of the target block.

The thresholds (THRESHOLD_ABOVE and THRESHOLD_LEFT) in Equations (6) and (7) may be defined separately for different block sizes and block shapes (differences in block vertical and horizontal sizes) or different intra prediction modes and encoded, and reconstructed by the decoder. Alternatively, the values of THRESHOLD_ABOVE and THRESHOLD_LEFT may be set to the same value, only one of which is encoded and decoded by the decoder. In the decoder, the threshold reconstructed by the data analyzer 202 in FIG. 2 is input to the prediction signal generator 208. In the prediction signal generator 208, the values of Interpolate_Above and Interpolate_Left are calculated based on the input threshold (step 560 in FIG. 3 or step 680 in FIG. 4).

Instead of providing the determination criteria in steps 520, 620, 625, and 640, the determination result may be included in the bit stream to be encoded and decoded by the decoder. In this case, in the prediction signal generator 103 in FIG. 1, the values (0 or 1) of Interpolate_Above and Interpolate_Left, the two values, are obtained based on the size of the target block and the results in Equation (6) and (7) and are encoded as prediction information necessary to predict each block or each block group consisting of a plurality of blocks. In other words, those values are sent to the entropy encoder 111 through the line L112 for encoding and then output from the output terminal 112. When the values (0 or 1) of Interpolate_Above and Interpolate_Left are derived, the correlation of block size between the target block and the neighbouring block and the size of the target block, and the intra prediction mode as described above may be used.

In the data analyzer 202 in FIG. 2, the values of Interpolate_Above and Interpolate_Left are decoded for each block or for each block group consisting of a plurality of blocks and are input to the prediction signal generator 208. Those two values may be separately encoded and decoded, or the two values may be encoded and decoded as a set.

Figure 15:
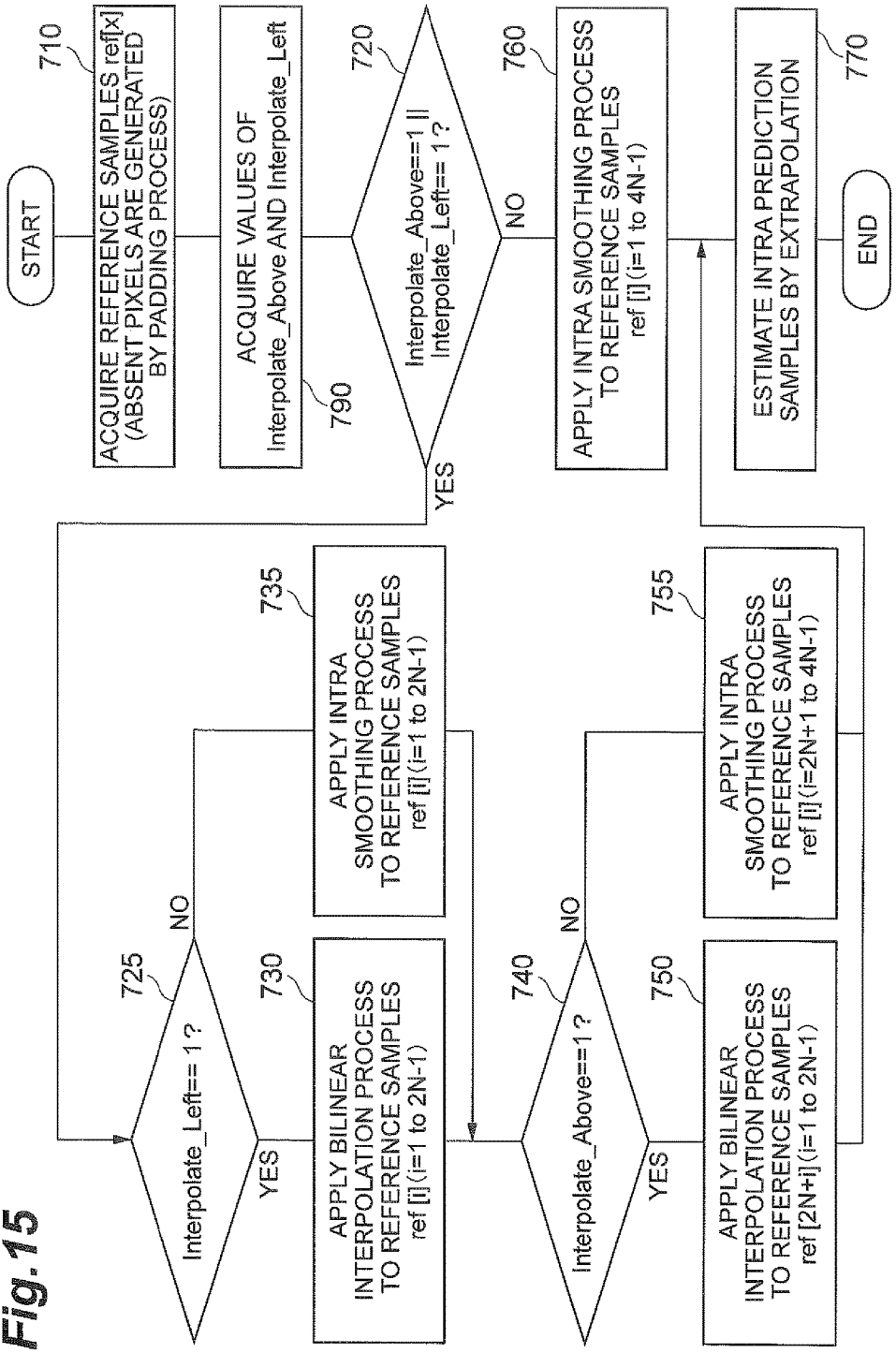
FIG. 15 is a flowchart showing a second another example of the intra-picture prediction method according to the embodiment of the present invention.

The process of the intra-picture prediction method performed in the prediction signal generator 208 in FIG. 2 is described using FIG. 15. In this case, FIG. 15 replaces FIG. 4. In FIG. 14, in step S406, the values of Interpolate_Above and Interpolate_Left decoded together with the intra prediction mode are derived. First, in step 710, the prediction signal generator (103 or 208, the reference numeral is hereinafter omitted) derives the reference samples ref[x] (x=0 to 4N), as shown in the pixel group 270 in FIG. 7, from the block memory (113 or 215, the reference numeral is hereinafter omitted). If the neighbouring blocks have not yet been reconstructed because of the encoding order or other reasons, and all the 4N+1 reference samples cannot be derived, the missing samples are substituted through the padding process (the values of the neighbouring samples are copied), whereby 4N+1 reference samples are prepared. The details of the padding process are described in Non Patent Literature 1.

Next, in step 790, the values of Interpolate_Above and Interpolate_Left are derived. In step 720, the prediction signal generator determines whether either Interpolate_Above or the value of Interpolate_Left takes a value "1". If either takes a value "1", the process proceeds to step 725. If not satisfied, the process proceeds to step 760. In step 760, intra smoothing by the 121 filter is applied to the reference sample group with Equations (8) and (9).

In step 725, if the value of Interpolate_Left is "1", the process proceeds to step 730, and the bilinear interpolation process shown in Equations (1) and (2) is applied to the reference samples ref[x] (x=0 to 2N) to generate the interpolated reference samples ref'[x] (x=0 to 2N). If the value of Interpolate_Left is "0", the process proceeds to step 735, and intra smoothing by the 121 filter is applied to the left reference samples ref[x] (x=0 to 2N) with Equations (10) and (11).

Next, in step 740, if the value of Interpolate_Above is "1", the process proceeds to step 750, and the bilinear interpolation process is applied to the upper reference samples ref[i] (i=2N+1 to 4N) with Equations (3), (4), and (5). If the value of Interpolate_Above is "0", the process proceeds to step 755, and intra smoothing by the 121 filter is applied to the left reference samples ref[x] (x=2N+1 to 4N) with Equations (12), (13), and (14).

Finally, in step 770, the intra prediction samples of the target block are estimated by extrapolation (in the direction of intra-picture prediction) using the decoded intra prediction mode and the interpolated or smoothed reference samples ref'[x] (x=0 to 4N).

(B) Interpolation Process

In the description above, the bilinear interpolation is used in the interpolation process. However, another interpolation process may be used as long as a noise at the block boundary can be removed. For example, all the reference samples may be replaced with the mean value of the key reference samples. The interpolation process method may be changed according to the block size or the intra-picture prediction type The interpolation process method to be applied may be included in the bit stream to be encoded and decoded.

(C) Process Flow of Intra-Picture Prediction of Reference Samples

The flow of the process of estimating the intra prediction samples by extrapolation (in the direction of intra-picture prediction) is not limited to the procedure in FIG. 4. For example, steps 625, 630, and 635 and steps 640, 650, and 655 may be switched in their order. Equation (3) and Equation (12) may be carried out not in steps 650 and 655 but in steps 630 and 635. Since the process results of Equations (1), (3), and (5) and Equations (10), (12), and (14) are the same, they may be carried out together immediately before step 625 (between steps 620 and 625) or immediately after steps 650 and 655 (between step 650 or 655 and step 670).

The determination criteria in step 620 may only include the block size. In this case, Equation (12) may be replaced with Equations (15) and (16) because the process result is the same as that of FIG. 4.

ref'[2*N*]=ref[2*N*]

if Interpolate_Above==true||Interpolate_Left==true (15)

ref'[2*N*]=(ref[2*N*−1]+2*ref[2*N*]+ref[2*N*+1]+2)/4 others (16)

where ref'[2N] represents the values of the smoothed reference sample.

(D) Block Size

Figure 12:
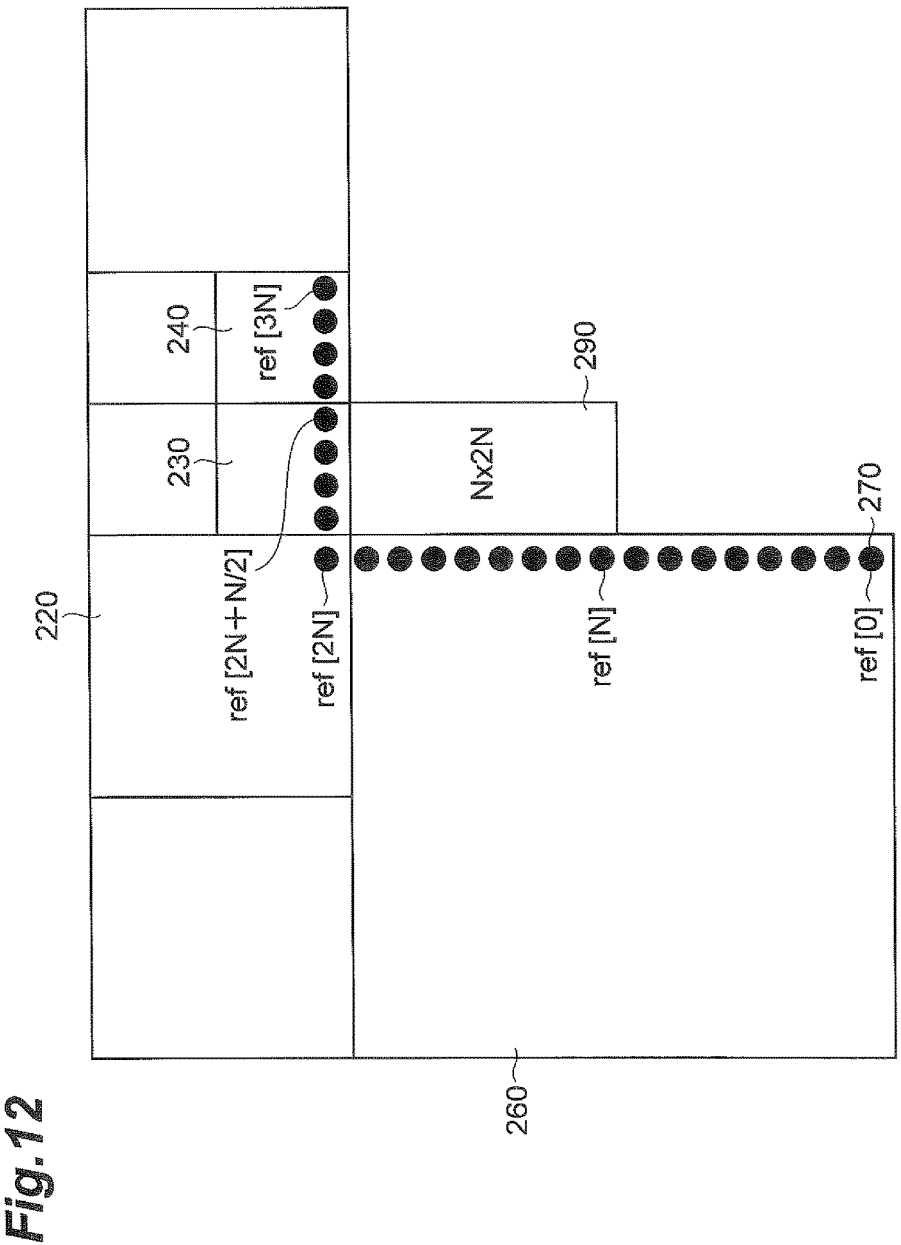
FIG. 12 is a diagram illustrating another example of reference samples used in intra-picture prediction.

In the description above, the target block is a square block. The interpolation process for the reference samples according to the present invention can be applied to a non-square block. An example of a target block 290 of a block size of N×2N is shown in FIG. 12. In this case, the number of ref[x] is 3N+1.

(E) Key Reference Sample

In the description above, the three key reference samples are located at the ends and the center of the reference sample group. However, the number and the position are not limited thereto. For example, the number or position may be changed according to the size of the reference block or the correlation between the reference block and the neighbouring block. The number and position of the key reference samples may also be included in the bitstream to be encoded and decoded. The three key reference samples at the ends and the center of the reference sample group may be set as defaults, and whether to use the defaults or other key reference samples may be encoded as instruction information and decoded. In the data analyzer 202 in FIG. 2, the key reference samples are updated. As the key reference samples to be updated, ref[N+N/2] and ref[2N+N/2] may be added in FIG. 7 or may be used in place of ref[2N]. Alternatively, ref[N/2] and ref[3N+N/2] may be used in place of ref[0] and ref[4N], and the 121 filter may be applied to ref[1] to ref[N/2−1] and ref[3N+N/2] to ref[4N−1].

(F) Equations of Determination Criteria

The determination equations used in steps 520, 620, 625, and 640 are not limited to Equations (6) and (7). For example, ref[N+1] and ref[3N+1] may be used in place of ref[N] and ref[3N] in FIG. 7.

What is claimed is:

1. A moving picture prediction decoding device comprising:
   decoding means for decoding, from encoded compression data for a plurality of divided blocks, an intra prediction mode indicating an intra-picture prediction method of a target block to be decoded, and a compressed residual signal;
   prediction signal generation means for generating an intra-picture prediction signal using the intra prediction mode and previously reconstructed reference samples located adjacent to the target block;
   residual signal restoration means for restoring a reconstructed residual signal of the target block from the compressed residual signal; and
   block storage means for restoring a pixel signal of the target block by adding the prediction signal to the reconstructed residual signal, and storing the reconstructed pixel signal of the target block to be used as reference samples, wherein
   the prediction signal generation means derives reference samples from previously reconstructed blocks, stored in the block storage means, which neighbour the target block, performs an interpolation process between two or more key reference samples located at predetermined positions among the reference samples for generating interpolated reference samples, and generates the intra-picture prediction signal by extrapolating the interpolated reference samples based on the intra prediction mode,
   the key reference samples are three reference samples as located at an end and a center of a reference sample group,
   the prediction signal generation means carries out the interpolation process of the reference samples or a smoothing process of the reference samples based on: a result of the comparison between a predetermined threshold value, and a first absolute value which is an absolute value of the difference between the sum of two key reference samples located at one end and a center of the reference sample group and twice the value of a reference sample located at a center of the two key reference samples; a result of the comparison between the threshold value, and a second absolute value which is an absolute value of the difference between the sum of two key reference samples located at another end and a center of the reference sample group and twice the value of the reference sample located at a center of the two key reference samples; and the size of the target block,
   the prediction signal generation means carries out the interpolation process of the reference samples if the first absolute value is smaller than the predetermined threshold value, and the second absolute value is smaller than the predetermined threshold value, and the predetermined threshold value is a value restored by the moving picture prediction decoding device.

2. A moving picture prediction decoding method executed by a moving picture prediction decoding device, the moving picture prediction decoding method comprising:

a decoding step of decoding, from encoded compression data for a plurality of divided blocks, an intra prediction mode indicating an intra-picture prediction method of a target block to be decoded and a compressed residual signal;

a prediction signal generation step of generating an intra-picture prediction signal using the intra prediction mode and previously reconstructed reference samples located adjacent to the target block;

a residual signal restoration step of restoring a reconstructed residual signal of the target block from the compressed residual signal; and a block storage step of restoring a pixel signal of the target block by adding the prediction signal to the reconstructed residual signal, and storing the reconstructed pixel signal of the target block to be used as reference samples, wherein in the prediction signal generation step, reference samples are derived from previously reconstructed blocks, which are stored and neighbour the target block, an interpolation process is performed between two or more key reference samples located at predetermined positions among the reference samples for generating interpolated reference samples, and the intra-picture prediction signal is generated by extrapolating the interpolated reference samples based on the intra prediction mode, the key reference samples are three reference samples as located at an end and a center of a reference sample group, the prediction signal generation step carries out the interpolation process of the reference samples or a smoothing process of the reference samples based on: a result of the comparison between a predetermined threshold value, and a first absolute value which is an absolute value of the difference between the sum of two key reference samples located at one end and a center of the reference sample group and twice the value of a reference sample located at a center of the two key reference samples; a result of the comparison between the threshold value, and a second absolute value which is an absolute value of the difference between the sum of two key reference samples located at another end and a center of the reference sample group and twice the value of the reference sample located at a center of the two key reference samples; and the size of the target block, in the prediction signal generation step, the interpolation process of the reference samples is carried out if the first absolute value is smaller than the predetermined threshold value, and the second absolute value is smaller than the predetermined threshold value, and the predetermined threshold value is a value restored by the moving picture prediction decoding device.

* * * * *